(12) United States Patent
Allard et al.

(10) Patent No.: US 8,020,657 B2
(45) Date of Patent: Sep. 20, 2011

(54) SYSTEMS AND METHODS FOR OBSTACLE AVOIDANCE

(75) Inventors: James Allard, Newton, MA (US); Kathleen A. Wienhold, Arlington, MA (US); William Robert Norris, Rock Hill, SC (US); Anthony Francis Catalfano, Davenport, IA (US)

(73) Assignees: Deere & Company, Moline, IL (US); iRobot Corporation, Bedford, MA (US)

( * ) Notice: Subject to any disclaimer, the term of this patent is extended or adjusted under 35 U.S.C. 154(b) by 1048 days.

(21) Appl. No.: 11/584,097

(22) Filed: Oct. 20, 2006

(65) Prior Publication Data

US 2007/0193798 A1 Aug. 23, 2007

Related U.S. Application Data

(60) Provisional application No. 60/729,445, filed on Oct. 21, 2005, provisional application No. 60/729,388, filed on Oct. 21, 2005, provisional application No. 60/780,389, filed on Mar. 8, 2006, provisional application No. 60/838,704, filed on Aug. 18, 2006.

(51) Int. Cl.
  *G01C 21/20* (2006.01)
(52) U.S. Cl. .......................................... 180/167; 701/23
(58) Field of Classification Search .................. 180/167, 180/168, 169; 701/23, 24, 25, 26, 27, 28
See application file for complete search history.

(56) References Cited

U.S. PATENT DOCUMENTS

| | | | |
|---|---|---|---|
| 4,155,417 A | 5/1979 | Ziems | |
| 4,202,037 A | 5/1980 | Glaser et al. | |
| 4,297,734 A | 10/1981 | Laishley et al. | |
| 4,361,202 A | 11/1982 | Minovitch | |
| 4,579,209 A | 4/1986 | Pacht | |
| 5,170,352 A | 12/1992 | McTamaney et al. | |
| 5,227,973 A | 7/1993 | Marcantonio | |
| 5,245,422 A | 9/1993 | Borcherts et al. | |
| 5,400,864 A | 3/1995 | Winner et al. | |
| 5,455,409 A | 10/1995 | Smith et al. | |
| 5,471,560 A | 11/1995 | Allard et al. | |

(Continued)

FOREIGN PATENT DOCUMENTS

DE 3404202 A1 5/1987

(Continued)

OTHER PUBLICATIONS

Yokokohji, et al., "Operation Modes for Cooperating with Autonomous Functions in Intelligent Teleoperation Systems," (seven pages) IEEE International Workshop on Robot and Human Communication, 1992.

(Continued)

*Primary Examiner* — Jeffrey J Restifo

(74) *Attorney, Agent, or Firm* — Kilpatrick, Townsend & Stockton LLP

(57) ABSTRACT

Embodiments of the invention provide systems and methods for obstacle avoidance. In some embodiments, a robotically controlled vehicle capable of operating in one or more modes may be provided. Examples of such modes include teleoperation, waypoint navigation, follow, and manual mode. The vehicle may include an obstacle detection and avoidance system capable of being implemented with one or more of the vehicle modes. A control system may be provided to operate and control the vehicle in the one or more modes. The control system may include a robotic control unit and a vehicle control unit.

16 Claims, 31 Drawing Sheets

U.S. PATENT DOCUMENTS

| | | | |
|---|---|---|---|
| 5,508,689 A | 4/1996 | Rado et al. | |
| 5,511,147 A | 4/1996 | Abdel-Malek | |
| 5,555,503 A | 9/1996 | Kyrtsos et al. | |
| 5,563,478 A | 10/1996 | Suganuma | |
| 5,602,735 A | 2/1997 | Wada | |
| 5,652,849 A | 7/1997 | Conway et al. | |
| 5,675,229 A | 10/1997 | Thorne | |
| 5,684,696 A | 11/1997 | Rao et al. | |
| 5,715,902 A | 2/1998 | Petrovich et al. | |
| 5,794,164 A | 8/1998 | Beckert et al. | |
| 5,831,826 A | 11/1998 | Van Ryswyk | |
| 5,920,172 A * | 7/1999 | Bauer | 318/587 |
| 5,984,880 A | 11/1999 | Launder et al. | |
| 5,995,883 A * | 11/1999 | Nishikado | 701/23 |
| 6,008,985 A | 12/1999 | Lake | |
| 6,038,496 A | 3/2000 | Dobler et al. | |
| 6,053,270 A | 4/2000 | Nishikawa et al. | |
| 6,055,042 A * | 4/2000 | Sarangapani | 356/4.01 |
| 6,058,427 A | 5/2000 | Viswanath | |
| 6,088,020 A | 7/2000 | Mor | |
| 6,108,031 A | 8/2000 | King et al. | |
| 6,113,395 A | 9/2000 | Hon | |
| 6,169,940 B1 | 1/2001 | Jitsukata et al. | |
| 6,198,992 B1 | 3/2001 | Winslow | |
| 6,233,504 B1 | 5/2001 | Das et al. | |
| 6,236,916 B1 * | 5/2001 | Staub et al. | 701/29 |
| 6,253,161 B1 | 6/2001 | Arias-Estrada | |
| 6,259,980 B1 | 7/2001 | Peck et al. | |
| 6,321,147 B1 * | 11/2001 | Takeda et al. | 701/23 |
| 6,356,819 B1 | 3/2002 | Winslow | |
| 6,434,462 B1 | 8/2002 | Belvy et al. | |
| 6,445,983 B1 | 9/2002 | Dickson et al. | |
| 6,480,762 B1 | 11/2002 | Uchikubo et al. | |
| 6,535,793 B2 | 3/2003 | Allard | |
| 6,592,412 B1 | 7/2003 | Geil et al. | |
| 6,600,986 B2 | 7/2003 | Steinle et al. | |
| 6,633,800 B1 | 10/2003 | Ward et al. | |
| 6,694,260 B1 | 2/2004 | Rekow | |
| 6,760,654 B2 | 7/2004 | Beck | |
| 6,789,014 B1 | 9/2004 | Rekow et al. | |
| 6,813,557 B2 | 11/2004 | Schmidt et al. | |
| 6,845,297 B2 | 1/2005 | Allard | |
| 6,873,911 B2 | 3/2005 | Nishira et al. | |
| 6,901,319 B1 | 5/2005 | Nelson et al. | |
| 6,927,699 B2 * | 8/2005 | Samukawa et al. | 340/903 |
| 6,950,882 B1 | 9/2005 | Weber et al. | |
| 6,975,246 B1 * | 12/2005 | Trudeau | 340/903 |
| 7,024,278 B2 * | 4/2006 | Chiappetta et al. | 700/245 |
| 7,123,522 B2 | 10/2006 | Ho et al. | |
| 7,188,000 B2 * | 3/2007 | Chiappetta et al. | 700/245 |
| 7,299,057 B2 * | 11/2007 | Anderson | 455/456.1 |
| 2001/0018640 A1 | 8/2001 | Matsunaga | |
| 2001/0056544 A1 | 12/2001 | Walker | |
| 2002/0035416 A1 | 3/2002 | De Leon | |
| 2002/0104300 A1 | 8/2002 | Hunt | |
| 2002/0110155 A1 | 8/2002 | Pearce | |
| 2002/0169531 A1 | 11/2002 | Kawazoe et al. | |
| 2003/0032335 A1 | 2/2003 | Garnett | |
| 2003/0038842 A1 | 2/2003 | Peck et al. | |
| 2003/0080772 A1 | 5/2003 | Giacomini et al. | |
| 2004/0052047 A1 | 3/2004 | Bresniker | |
| 2004/0061596 A1 | 4/2004 | Egami | |
| 2004/0114584 A1 | 6/2004 | Patz | |
| 2004/0158379 A1 | 8/2004 | Horbaschek | |
| 2004/0168837 A1 | 9/2004 | Michaud et al. | |
| 2004/0193363 A1 | 9/2004 | Schmidt et al. | |
| 2004/0217881 A1 | 11/2004 | Pedyash | |
| 2004/0239490 A1 | 12/2004 | Chiba et al. | |
| 2004/0243285 A1 | 12/2004 | Gounder | |
| 2005/0002419 A1 | 1/2005 | Doviak et al. | |
| 2005/0021195 A1 * | 1/2005 | Zeitler et al. | 701/23 |
| 2005/0021860 A1 | 1/2005 | Kelly et al. | |
| 2005/0092542 A1 | 5/2005 | Turner | |
| 2005/0159870 A1 | 7/2005 | Tohdo et al. | |
| 2005/0264998 A1 | 12/2005 | McCutcheon et al. | |
| 2006/0022625 A1 | 2/2006 | Hampo | |
| 2006/0075176 A1 | 4/2006 | Okamoto | |
| 2006/0237968 A1 | 10/2006 | Chandrasekaran | |
| 2006/0267777 A1 | 11/2006 | Moore | |
| 2007/0193798 A1 * | 8/2007 | Allard et al. | 180/169 |
| 2007/0198144 A1 | 8/2007 | Norris et al. | |
| 2007/0198145 A1 | 8/2007 | Norris et al. | |
| 2007/0219666 A1 | 9/2007 | Filippov et al. | |
| 2009/0125175 A1 * | 5/2009 | Park et al. | 701/28 |

FOREIGN PATENT DOCUMENTS

| | | |
|---|---|---|
| EP | 1184254 | 3/2002 |
| EP | 14881945 | 12/2004 |
| GB | 2128842 A | 8/1983 |
| JP | 11149315 A | 6/1999 |
| WO | WO 99/05580 | 2/1999 |
| WO | WO 01/26338 A2 | 4/2001 |
| WO | WO 2004/086084 | 10/2004 |
| WO | WO 2007/048003 | 4/2007 |
| WO | WO 2007/050406 | 5/2007 |
| WO | WO 2007/050407 | 5/2007 |

OTHER PUBLICATIONS

International Search Report and Written Opinion for PCT/US2006/040801 (ten pages), dated Mar. 1, 2007.

International Search Report and Written Opinion for PCT/US2006/040800 (eight pages), dated Mar. 1, 2007.

International Search Report and Written Opinion for PCT/US2006/041177 (sixteen pages), dated Jun. 11, 2007.

International Preliminary Report on Patentability for PCT/US2006/040801 (eight pages), dated Apr. 23, 2008.

International Preliminary Report on Patentability for PCT/US006/041177 (ten pages), dated Apr. 23, 2008.

International Preliminary Report on Patentability for PCT/US2006/041227 (eleven pages), dated Apr. 23, 2008.

International Preliminary Report on Patentability for PCT/US2006/040800 (seven pages.), dated Apr. 23, 2008.

Non-Final Office Action for U.S. Appl. No. 11/584,085 (ten pages), mailed Aug. 31, 2009.

Non-Final Office Action for U.S. Appl. No. 11/584,087 (sixteen pages), mailed Aug. 31, 2009.

Response to Restriction Requirement for U.S. Appl. No. 11/584,085 (ten pages), dated Sep. 30, 2009.

Response to Restriction Requirement for U.S. Appl. No. 11/584,087 (three pages), dated Oct. 22, 2009.

Non-Final Office Action for U.S. Appl. No. 11/584,085 (ten pages), mailed Dec. 16, 2009.

Non-Final Office Action for U.S. Appl. No. 11/584,084 (six pages), mailed Jan. 13, 2010.

Response to Restriction Requirement for U.S. Appl. No. 11/584,084 (two pages), dated Feb. 5, 2010.

Non-Final Office Action for U.S. Appl. No. 11/584,087 (sixteen pages), mailed Feb. 19, 2010.

Patent Abstracts of Japan, JP 2000094373 A, Apr. 4, 2000, Takahashi Katsunori.

Corbett, G.K., et al., "A Human Factors Tested for Ground-Vehicle Telerobotics Research," *Southeastcon '90 Proceedings*, vol. 2, pp. 618-620, 1990.

Shimoga, et al., "Touch and Force Reflection for Telepresence Surgery," *IEEE*, pp. 1049-1050, 1994.

Mair, "Telepresence—The Technology and Its Economic an Social Implications," *IEEE*, pp. 118-124, 1997.

Ohashi et al., "The Sensor Arm and the Sensor Glove II—Haptic Devices for VR Interface," *IEEE*, p. 785, 1999.

Green, P.S., et al., "Telepresence Surgery," *IEEE*, Engeneering in Medicine and Biology, pp. 324-329, May/Jun. 1995.

Naki, et al., "7 DOF Arm Type Haptic Interface for Teleoperation and Virtual Reality Systems," *Proceedings of the 1998 IEEE/RSJ Intl. Conference on Intelligent Robots and Systems*, pp. 1266-1271, 1998.

"Tech Firm Showing Off Gadgets for Consumers," *The Wall Street Journal*, 2001.

"Introducing The iRobot-LE," iRobot Corpation, http://www.irobot.com/ir/index.htm Retrieval Date Dec. 5, 2000.

Department of Energy, Technology Application, "Tactical Robotic Vehicle Aids in Battlefield Surveillance," *NTIS Tech Notes*, Springfield, VA, Dec. 1990.

International Search Report and the Written Opinion for PCT/US2006/041227 dated Jun. 11, 2007.

Spofford, John R., et al., "*Description of the UGV/Demo II System*," Proceedings: Association for Unmanned Vehicle Systems International Conference, 1997, pp. 255-264 (12 pages).

*Astronomical Data Analysis Software & Systems XIV*, Pasadena, CA, Oct. 24-27, 2004 (194 pages).

Beard, A, et al., "*The Use of CANbus in CARMA*," Astronomical Data Analysis Software & Systems XIV, Pasadena, CA, Oct. 24-27, 2004, p. 153 (1 page).

Rankin, Arturo L., et al."*Passive perception system for day/night autonomous off-road navigation*," Proceedings of the SPIE Defense and Security Symposium: Unmanned Ground Vehicle Technology VI Conference, Mar. 2005 (16 pages).

Wikipedia, "*Internet Protocol Suite*," http://en.wikipedia.org/wiki/Internet_Protocol_Suite, accessed Apr. 13, 2010) (5 pages).

Amendment and Response to Non-Final Office Action for U.S. Appl. No. 11/584,085, filed Apr. 15, 2010 (15 pages).

Non-Final Office Action for U.S. Appl. No. 11/584,084, mailed May 7, 2010 (39 pages).

Final Office Action for U.S. Appl. No. 11/584,085, mailed May 10, 2010 (11 pages).

Amendment and Response to Non-Final Office Action, filed Jun. 21, 2010 (33 pages).

Amendment and Response to Non-Final Office Action for U.S. Appl. No. 11/584,084, filed Oct. 5, 2010 (58 pages).

Final Office Action for U.S. Appl. No. 11/584,085, mailed Aug. 25, 2010 (14 pages).

Notice of Allowance for U.S. Appl. No. 11/584,087, mailed Sep. 2, 2010, (6 pages).

Amendment and Response to Final Office Action for U.S. Appl. No. 11/584,085, filed Oct. 25, 2010 (16 pages).

Advisory Action for U.S. Appl. No. 11/584,085, mailed Nov. 4, 2010 (3 pages).

Amendment and Response to Final Office Action for U.S. Appl. No. 11/584,085, filed Nov. 26, 2010 (16 pages).

U.S. Appl. No. 11/584,084 Office Action mailed on Jan. 4, 2011, 34 Pages.

\* cited by examiner

SYSTEMS AND METHODS FOR OBSTACLE AVOIDANCE

RELATED APPLICATIONS

This application claims the benefit of U.S. Provisional Patent Application No. 60/729,445, filed Oct. 21, 2005, U.S. Provisional Patent Application No. 60/729,388, filed Oct. 21, 2005, U.S. Provisional Patent Application No. 60/780,389, filed Mar. 8, 2006 and U.S. Provisional Patent Application No. 60/838,704, filed Aug. 18, 2006, each of which is incorporated herein by reference in its entirety.

This application is related to U.S. patent application entitled, "Systems and Methods for Switching Between Autonomous and Manual Operation of a Vehicle" Ser. No. 11/584,087, U.S. Non-provisional Patent Application entitled, "Versatile Robotic Control Module" Ser. No. 11/584,097, and U.S. Non-provisional Patent Application entitled, "Networked Multi-Role Robotic Vehicle" Ser. No. 11/584,085, each of which is filed herewith and incorporated herein by reference in its entirety.

FIELD OF THE INVENTION

This invention relates generally to systems and methods for autonomous control of vehicles and vehicular sensors, actuators, and/or communications. More particularly, embodiments of this invention relate to systems and methods for obstacle avoidance using two-dimensional and three-dimensional information.

BACKGROUND OF THE INVENTION

Robotic or autonomous vehicles (sometimes referred to as mobile robotic platforms) generally have a robotic control system that controls the operational systems of the vehicle. In a vehicle that is limited to a transportation function, the operational systems may include steering, braking, transmission, and throttle systems. In October 2005, five autonomous vehicles (of twenty-three finalist vehicles) successfully completed the "Grand Challenge" of the United States Defense Advanced Research Projects Administration (DARPA), a competition requiring fully robotic vehicles to traverse a course covering more than one hundred miles. These vehicles were outfitted with robotic control systems in which a bank of computers controlled the operational systems of the vehicle, such as the steering, braking, transmission, and throttle, subject to autonomous decisions made by programs on board the vehicle in response to sensor input, without human intervention on the course itself.

Robotic control system sensor inputs may include data associated with the vehicle's destination, preprogrammed path information, and detected obstacle information. Based on one or more of data associated with the information above, the vehicle's movements are controlled. Detecting obstacles, however, may provide false data points, incomplete obstacle data, and/or require large amounts of electronic storage capacity and processing power to compute the relevant data points. Additionally, combining obstacle data with trajectory or directional information may result in vehicle movements that may be characterized as jerky or incorrect vehicle movements.

SUMMARY

Certain embodiments of the present invention provide a robotic vehicle comprising a robotic control unit and a sensor for detecting object data representing detected obstacles or objects located outside of the robotic vehicle and transmitting the object data to the robotic control unit. The robotic control unit can generate a map, based on the object data, having map data. The map data may include position data of detected obstacles or objects. The robotic control unit may decide vehicle actions based on the map data.

In some embodiments, a robotic vehicle is provided that comprises a forward sensor assembly, a rear sensor assembly, and a robotic control unit. The forward sensor assembly can execute a front range scan to obtain forward data representing obstacles or objects at least in front of the vehicle. The rear sensor assembly can execute a rear range scan to obtain rear data representing obstacles or objects at least behind the vehicle. The robotic control unit can receive the forward and rear data and generating an obstacle map based on the forward and rear data. The robotic control unit may comprise a processor and a memory. The memory may comprise the obstacle map and executable code, such as a range guard application and a control application. The range guard application may detect interruptions in the forward and rear data and substitute, based at least on the interruptions, data in the forward and rear data indicating the presence of obstacles in the forward and rear scan range. The control application may determine a trajectory based at least in part on the obstacle map and outputting control commands to a vehicle control unit based at least in part on the trajectory.

In some embodiments of the present invention, a laser scanner assembly may be provided that is adapted to connect to a robotic vehicle. The laser scanner assembly may comprise a laser scanner, a scanner mechanism, and a guard. The laser scanner may transmit a laser beam to detect the presence of an obstacle. The scanner mechanism may manipulate the position of the laser scanner. The guard may protect the laser scanner from damage and allow the laser beam to detect the presence of an obstacle. The guard may comprise a base, at least two support elements, and a plurality of support ribs. The base may connect the laser scanner assembly to the robotic vehicle. The at least two support elements may connect to the base. The plurality of support ribs may connect to the at least two support elements.

In some embodiments of the present invention, the robotic vehicle may be directed to follow an object. The object may be identified for the robotic vehicle to follow. The robotic vehicle's position relative to a previous position and a movement of the object may be estimated. The range position of the object may be estimated. The position of the object may be received. Whether the object is located within the estimated range position may be determined. A trajectory set based in part on the object position may be calculated. The trajectory set may comprise a plurality of trajectories. A preference value for each of the trajectories may be assigned. The trajectory set may be provided to a drive arbiter.

In one embodiment of the present invention, a robotic vehicle may be controlled using an obstacle map. A plurality of points representing part of an obstacle and a position of the obstacle at a particular time may be obtained. A time stamp may be associated with each point. The points may be mapped to a cell that is partitioned into grids. The plurality of points may be separated into old, current, and new points based on the associated time stamp. The center of at least one of the old points and the current points may be determined. The center of the new points may be determined. A position difference between the center of the new points and the center of at least one of the old points and the current points may be obtained.

A velocity of an object based on the position difference may be determined. The robotic vehicle may be controlled using the object velocity.

In one embodiment of the present invention, a three-dimensional map may be generated to use in a robotically controlled vehicle. A laser scanner may be used to execute a first scan of a scan range. Two-dimensional obstacle data points may be obtained that represent obstacles located in the scan range. Scan data may be associated with the obstacle data points. The scan data may comprise scan range data representing the scan range, scanner angle data representing the angle of the laser scanner, vehicle velocity data, and a laser scanner synch pulse. The scan data and obstacle data points may be sent to a robotic control unit. The obstacle data points may be time stamped. An obstacle map may be generated based in part on the time stamped obstacle data points and scan data.

In one embodiment of the present invention, three-dimensional obstacle data may be converted into two-dimensional obstacle data for controlling a robotic vehicle. A plurality of three-dimensional time stamped obstacle data may be obtained from a laser scanner. The obstacle data may represent the location of an obstacle. Time stamped velocity data of the robotic vehicle may be received. The obstacle data may be compared to pre-set criteria to separate the obstacle data into relevant obstacle data and irrelevant obstacle data. The irrelevant obstacle data are outside the pre-set criteria and are discarded. The relevant obstacle data may be correlated to a two-dimensional point cloud representing an index of a point array. Obstacle data having time stamps older than a pre-set threshold may be discarded. An obstacle map may be generated from the point array.

BRIEF DESCRIPTION OF THE DRAWINGS

These and other features, aspects, and advantages of the this invention are better understood when the following Detailed Description is read with reference to the accompanying drawings, wherein.

DETAILED DESCRIPTION

Embodiments of the invention provide systems and methods for obstacle avoidance. In some embodiments, a robotically controlled vehicle capable of operating in one or more modes may be provided. Examples of such modes include teleoperation, waypoint navigation, follow, and manual mode. The vehicle may include an obstacle detection and avoidance system capable of being implemented with one or more of the vehicle modes. A control system may be provided to operate and control the vehicle in the one or more modes or otherwise.

Illustrative Control System

Figure 1:
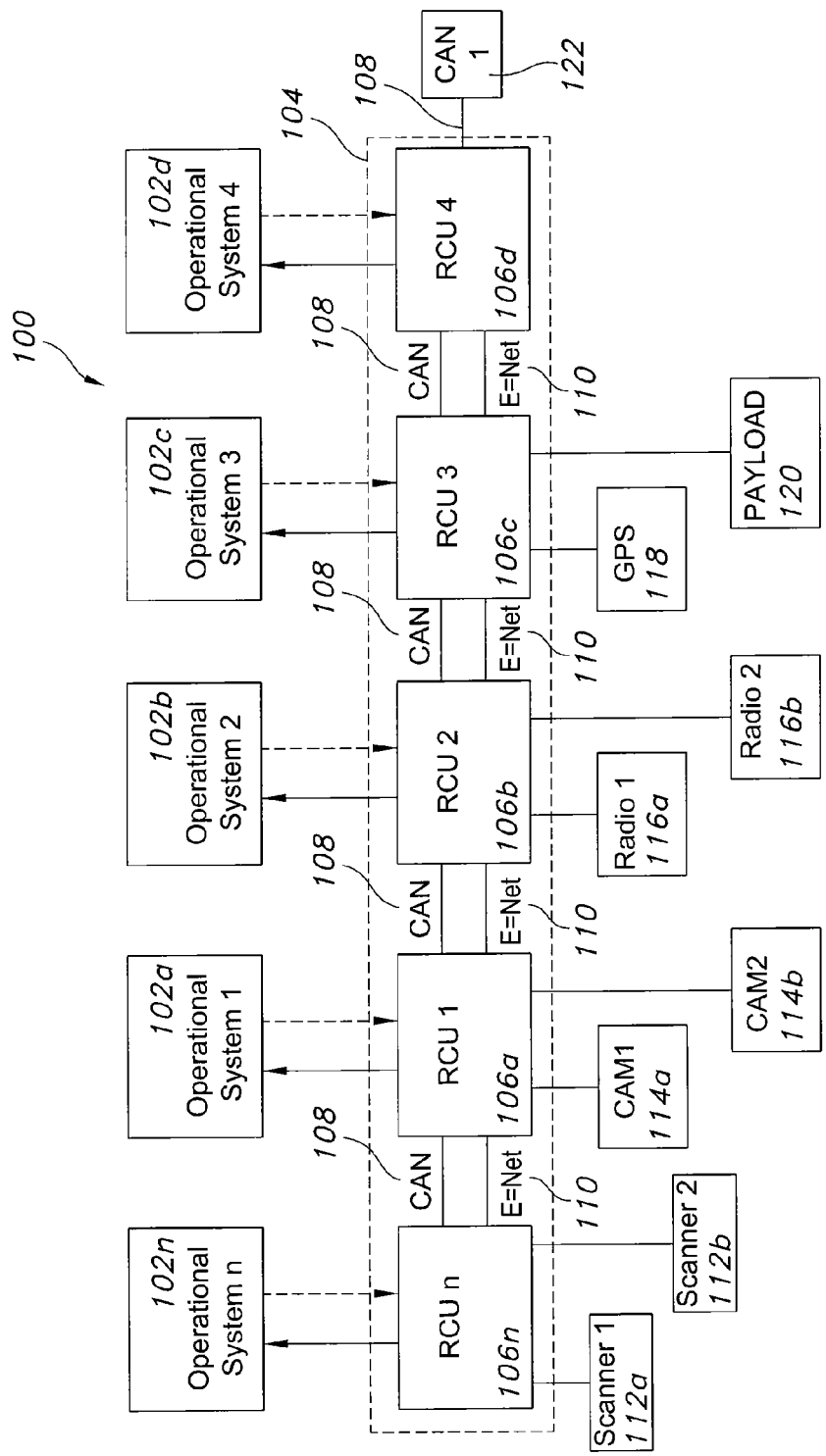
FIG. 1 is a block diagram illustrating a robotic control system in one embodiment of the present invention.

FIG. 1 is a high-level block diagram on a vehicle control system 100 of one embodiment of the present invention. The vehicle control system 100 shown in FIG. 1 includes a robotic control system 104, which in the embodiment shown includes the versatile robotic control modules, 106A-N. The robotic control modules may be connected and may communicate with each other and other control system and vehicle components via a Controller Area Network (CAN) bus 108 and a packet switched network 110, such as an Ethernet network. In some embodiments, only a packet switched network 110 may be used.

The vehicle control system shown in FIG. 1 also includes several operational systems, 102A-102N. Each operational system, 102A-102N may in some embodiments be in communication directly or indirectly with a robotic control module 106A-N. These operational systems 102A-102N can be used to control the movement of the vehicle and can include, for example, the steering system, the braking system, the throttle system, and the steering system. Each operational system may contain an actuator, such as a motor, for example, that can control the operation of the particular operational system. For example, the braking system can contain an actuator that controls the application of the brake for the vehicle.

The robotic control modules or robotic control units 106A-N can further be connected or otherwise receive inputs from and provide signals to scanners 112A-B, such as laser scanners, cameras 114A-B, radios 116A-B, and a Global Positioning System (GPS) 118. The robotic control modules 106A-N may also be connected to other suitable payloads and may be connected to one or more CAN devices 122. A CAN device can, for example, control headlights and other similar features of the vehicle. The robotic control modules 106A-N can receive inputs from these various devices, such as for example scanners 112A-B, cameras 114A-B, and the GPS 118 and determine the appropriate control behavior for the vehicle. The versatile robotic control modules 106A-N can communicate control information or signals to the operating systems to carry out the appropriate control behavior. For example, if the appropriate control behavior is to stop the vehicle, the robotic control unit (RCU) 106A can send control information to operate a braking actuator of the brake operating system 102A and cause the application of the vehicle brakes.

The vehicle may also comprise a vehicle control unit (VCU). The vehicle control unit receives inputs and utilizes the input to determine how to control one or more of the operational systems 102A-N. For example, the vehicle control unit may receive an input from a robotic control module that indicates that the vehicle should be turned to the right. In response to this signal, the vehicle control unit may output a control signal to the steering system to cause the actuator to turn the steering shaft.

Both the vehicle control unit and robotic control modules may each comprise a processor. A robotic vehicle control unit having a processor is described in more detail below in view of FIG. 19. The processor may comprise a computer-readable medium, such as a random access memory (RAM) coupled to the processor. The processor can execute computer-executable program instructions stored in memory, such as vehicular or robotic control algorithms as described in more detail below. Such processors may comprise a microprocessor, an ASIC, and state machines. Such processors may comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor with computer-readable instructions (such as executable code). Other examples of suitable media include, but are not limited to, a floppy disk, CD-ROM, DVD, magnetic disk, memory chip, ROM, RAM, an ASIC, a configured processor, optical media, magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise executable code from any suitable computer-programming language, including, for example, C, C++, C#, Visual Basic, Java, Python, Perl, and JavaScript.

Figure 2A:
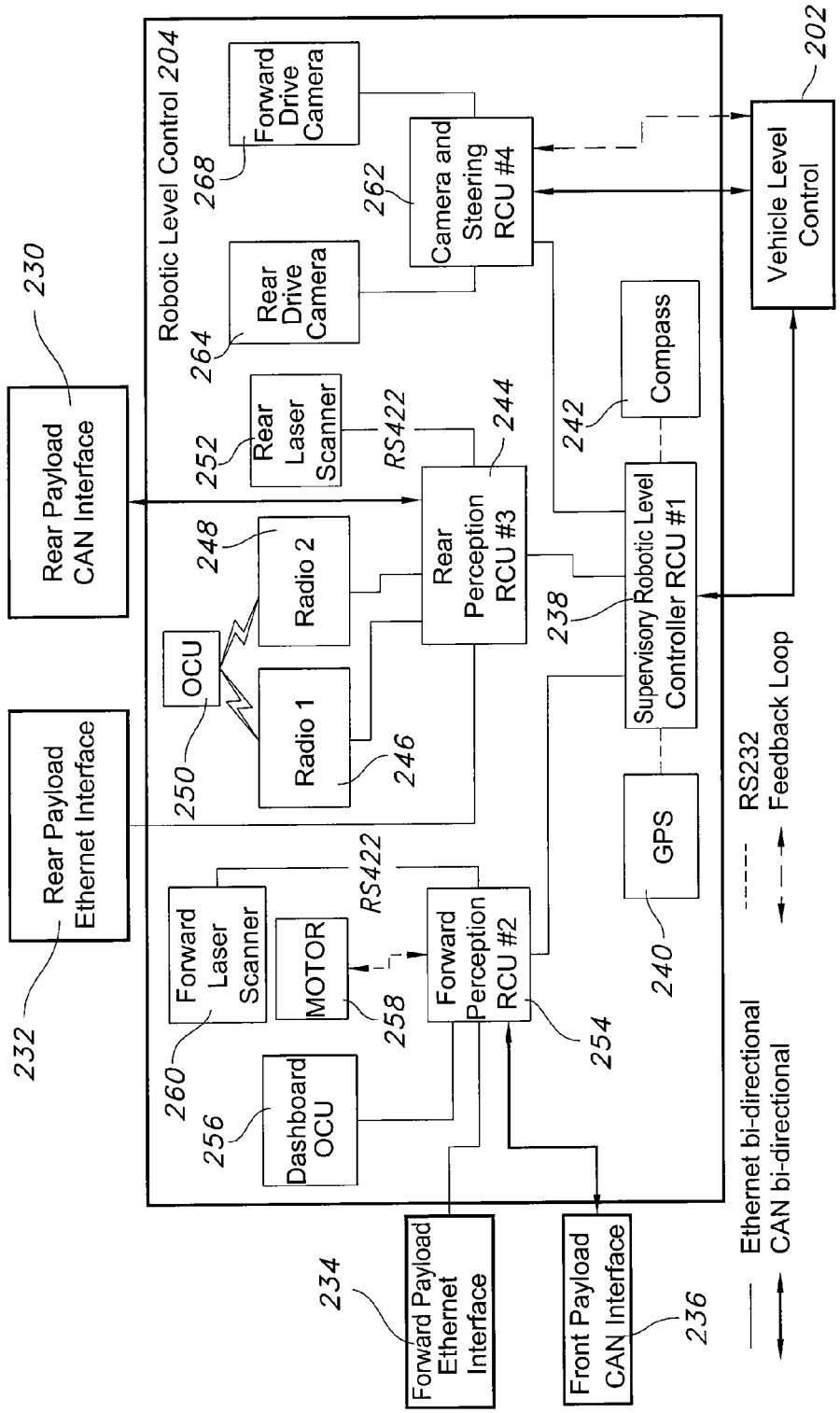
FIGS. 2A-C are block diagrams illustrating the robotic control system according embodiments of the present invention.
Figure 2B:
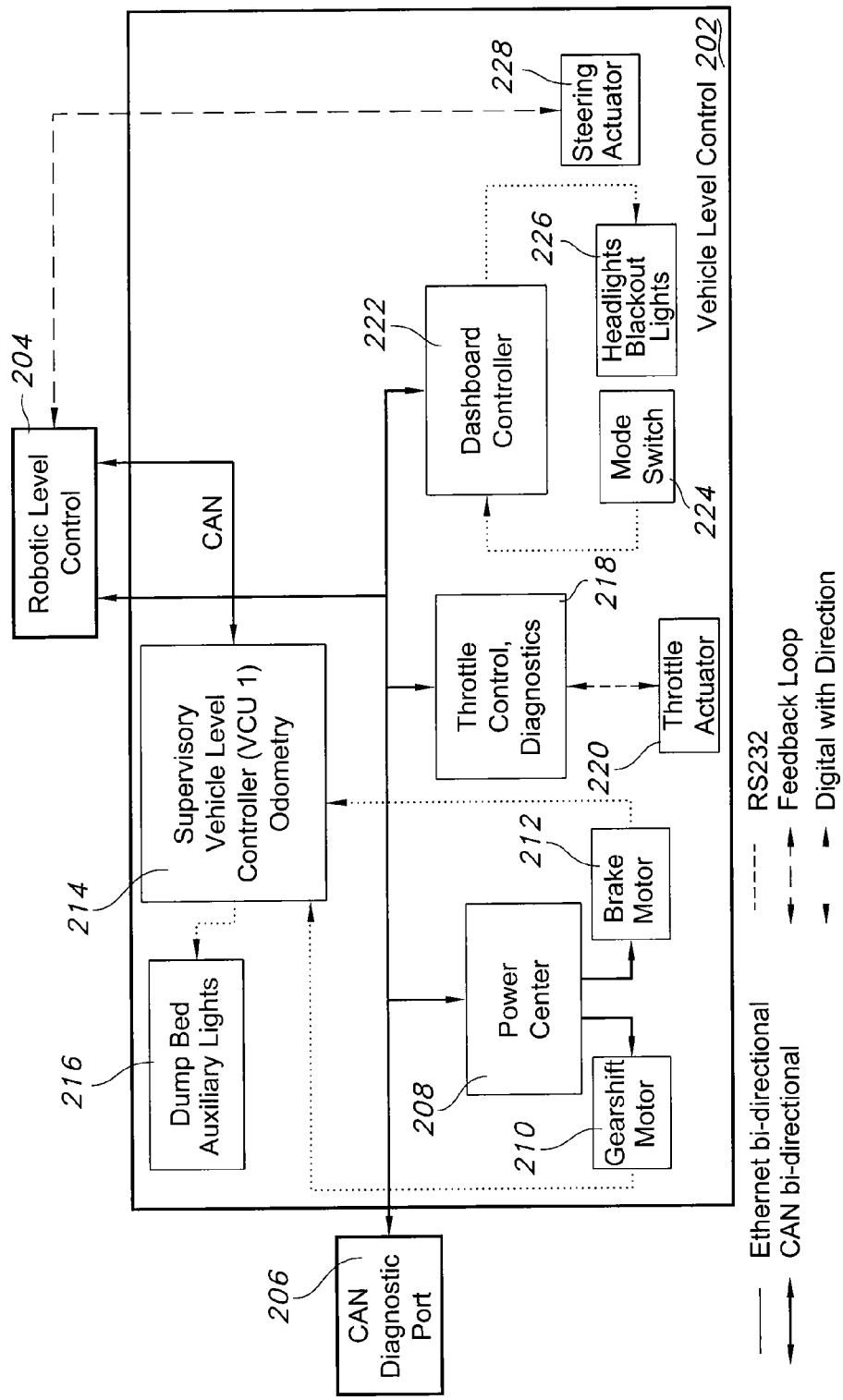

FIGS. 2A-B are functional schematic diagrams of an illustrative control system in one embodiment of the present invention. The robotic control system shown comprises four of the versatile robotic control modules or Robotic Control Units (RCU) and various sensors. The robotic control system receives various inputs from scanners, creates an obstacle map, determines control of the vehicle, and sends control information to the Vehicle Control Unit (VCU), which controls various operational systems of vehicle. The embodiment shown in FIGS. 2A-B comprises a vehicle control system, such as vehicle level control 202 and a robotic control system, such as robotic level control 204. The two sections 202, 204 operate as a hierarchy. The vehicle level control 202 maintains the personality of the vehicle for which it is configured.

The vehicle level control 202 comprises one external interface, a CAN diagnostic port 206. The vehicle level control 202 also comprises an electronic power center 208. The electronic power center provides power to a gearshift motor 210 and a brake motor 212. The gearshift motor 210 and brake motor 212 are the actuators for the transmission and brake systems, respectively.

The vehicle control system 202 also comprises a supervisory level controller (VCU 1) 214. This role could be performed by an additional RCU. For example, the VCU 214 can be replaced with an additional RCU (e.g., RCU #5), or a combination of some RCUs can be replaced with one or more additional VCU's, although a VCU does not have all of the functionality of the RCUs as described herein. The supervisory level controller 214 is in communication with various systems of the vehicle. For instance, the supervisory level controller 214 is in communication with the dump bed, auxiliary lights, and enunciator 216. The supervisory level controller 214 is also in communication with the gearshift motor 210 and the brake motor 212.

The vehicle control system 202 also comprises an APECS™ controller 218 for throttle control and diagnostics. This role could be performed by an additional RCU. The APECS™ controller 218 is in communication with the throttle actuator 220. The APECS™ controller 218 provides actuator signals to and receives feedback from the throttle actuator 220.

The vehicle level control section 202 also comprises a dashboard controller 222. The dashboard controller 222 provides control for a mode switch 224 and for headlights and blackout lights 226. The vehicle level control section 202 also comprises the steering actuator 228.

The robotic level control section 204 also comprises external interfaces. The external interfaces of the robotic control section 204 shown in FIG. 2A comprise a rear payload CAN interface 230 and a rear payload Ethernet interface 232. The external interfaces also comprise a front payload CAN interface 234 and Ethernet interface 236.

The robotic level control section 204 according to the embodiment shown in FIG. 2A includes four robotic control modules: a supervisory robotic control module 238, a rear perception robotic control module 244, a forward perception robotic control module 254, and a camera and steering robotic control module 262. The robotic control modules, 238, 244, 254, and 262 can be configured identically or can be configured for the specific function. If the robotic control modules are configured identically, then the robotic control modules can determine based on the location in the system or connection what function or role they will perform. For example, a resistor can be placed in a connection with a robotic control module and based on the resistance the robotic control module determines its respective function. Other ways of identifying the function or role of a robotic control module can be used.

Various elements of the vehicle level control section 202 are in communication with elements of the robotic level control section 204. For instance, the supervisory robotic level control module (RCU #1) 238 is in communication with the electronic power center 208, APECS™ controller 218, and dashboard 222. The supervisory robotic level control module 238 receives input from various sensors and provides commands for operation of a vehicle in an autonomous mode. U.S. patent application Ser. Nos. 10/972,082; 10/971,718; and 10/971,724 describe exemplary autonomous modes and control thereof.

In the embodiment shown in FIG. 2A, the supervisory robotic level control module 238 receives input from a GPS navigation/communication module or unit 240 (from, for example, NAVCOM Technology of Torrance, Calif.) and from a compass 242. These sensors provide position and heading information to the controller 238 for navigation purposes. Embodiments of the present invention may comprise other sensors as well. For instance, one embodiment comprises an inertial measurement unit (IMU), which measures acceleration of the vehicle in each direction. The supervisory robotic level control module 238 is also in communication with the rear perception robotic control module (RCU #3) 244. The rear perception robotic control module 244 may receive sensor input from for example, a laser sensor 252, such as a SICK laser scanner, via an RS422 connection.

The rear perception robotic control module 244 also is in communication with a pair of radio receivers, a Nova Roam™ EH 900 246 and an 802.11b-compatible radio 248. The radios allow the rear perception robotic control module 244 to receive commands from an operator control unit (OCU) 250. The OCU may be used, for example, for teleoperation of the vehicle in an autonomous mode.

The supervisory robotic level control module 238 in the embodiment shown in FIG. 2A is also in communication with the forward perception robotic control module 254. The forward perception robotic control module 254 is in communication with the dashboard operator control unit (OCU) 256. In the embodiment shown, the dashboard OCU 256 comprises a TDS Recon IPAQ™, a type of personal digital assistant. The forward perception robotic control module 254 is also in communication with a forward laser scanner 260. In one embodiment, the forward laser scanner 260 is a nodding-type laser scanner and includes a laser scanner motor 258 that controls the movement of the scanner 260. The forward perception robotic control module 254 sends control signals to control the laser scanner motor 258.

The supervisory robotic level control module 238 is also in communication with a camera and brake controller (RCU #4) 262. The camera and brake controller 262 is in communication with a rear drive camera 264 and a forward drive camera 268. The camera and brake controller 262 is also in two-way communication with the steering actuator 228 and supervisory vehicle level controller 214 of the vehicle control section 202.

The layout of the various controllers and sensors shown in FIGS. 2A-B may be implemented in a variety of ways in embodiments of the present invention. For instance, the various controllers may be combined or split in various ways depending on the number and types of sensors used and depending on the configuration of the vehicle. Also, the various sensors and instruments may be utilized in various ways. For instance, embodiments of the present invention may utilize sensor fusion to operate efficiently and effectively. Sensor fusion allows the vehicle to operate even when certain sensors are inoperative.

Figure 2C:
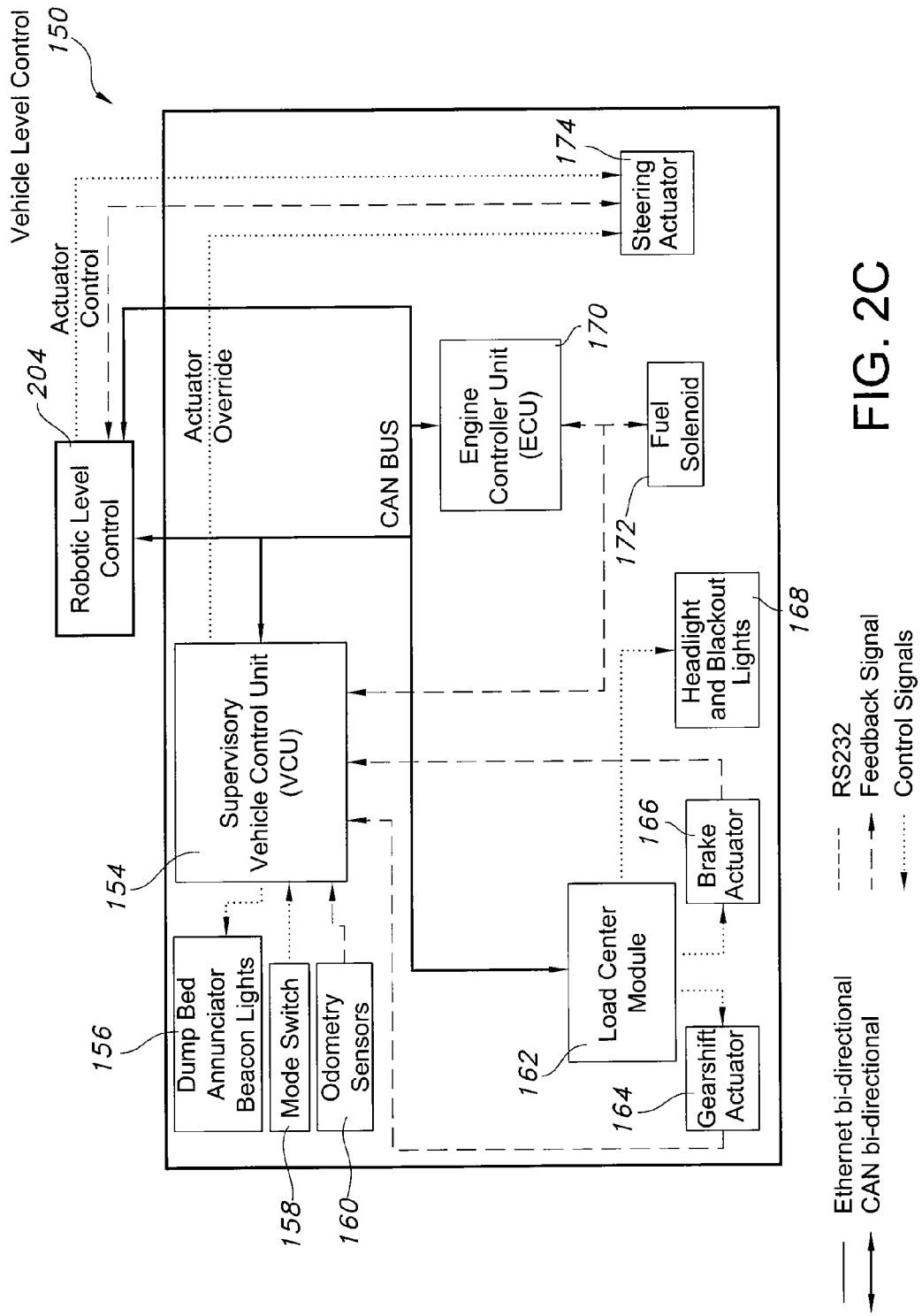

FIG. 2C shows another embodiment of a vehicle level control 150 in communication with the robotic level control 204 of FIG. 2C. In this embodiment, there is a supervisory vehicle control unit (VCU) 154 that corresponds to the supervisory vehicle level controller (VCU 1) in FIG. 2B. The supervisory VCU 154 may send control signals, also called "digital with direction" in other embodiments, to the dump bed, annunciator, and beacon lights 156. The supervisory VCU 154 may receive control signals from the mode switch 158. The supervisory VCU 154 also receives feedback signals, also called "feedback loop" in other embodiments, from each of the odometry sensors 160, the gear shift actuator 164, the brake actuator 166, and the fuel solenoid 172. In the embodiment of FIG. 2C, there is a separate odometry sensor 160. Also, in other embodiments the gear shift actuator 164, brake actuator 166, and fuel solenoid 172 are referred to interchangeably as the gearshift motor, the brake motor, and the throttle actuator, respectfully. The vehicle level control 150 also has a load center module 162, called a "power center" in other embodiments. The load center module 162 is in CAN communication with the robotic level control 204, and further sends control signals to each of the gear shift actuator 164, the brake actuator 166, and the headlights/blackout lights 168. Finally, the vehicle level control 150 may have an engine controller unit, or ECU 170, called a "throttle control" in other embodiments. The ECU 170 is in CAN communication with the robotic level control 204, and controls the fuel solenoid 172 to deliver fuel to the engine.

In one embodiment, the vehicle is equipped with an Obstacle Detection/Obstacle Avoidance (ODOA) system, embodiments of which are described below, which is designed to detect obstacles external to the vehicle, and to initiate the proper control actions to avoid them.

Robotic Control Module

Certain robotic control modules according to embodiments of the present invention can contain one or more of a processor and associated memory, such as a single board computer with a microprocessor, a network switch, such as an Ethernet switch, an actuator controller, such as a reprogrammable motor controller, an actuator amplifier, such as a motor amplifier, and a power supply within a single mountable housing.

As described in more detail below in view of FIGS. 19-28, executable code may be stored in memory of the robotic control module that can be executed by a CPU to enable the robotic control module to execute and arbitrate among robotic control behaviors. Each robotic control module in the robotic control system may be provided with multiple executable code parts for different modular roles within the control system. For example, each robotic control module can include executable code for supervisory role, for actuator control, for sensor monitoring, etc. The robotic control modules can be configurable to execute only a selected portion of the executable code appropriate for the role of the particular robotic control module. Examples of the parts of the executable code can be behavior arbitration code, behavior code, sensor driver code, drive controller code, actuator controller code, database management code, database data, and data converter code. Each robotic control module can determine the function or role they will perform and what executable code they will perform based on location, connections, or other suitable methods as described above. This provides for the interchangeability of the robotic control modules.

Figure 19:
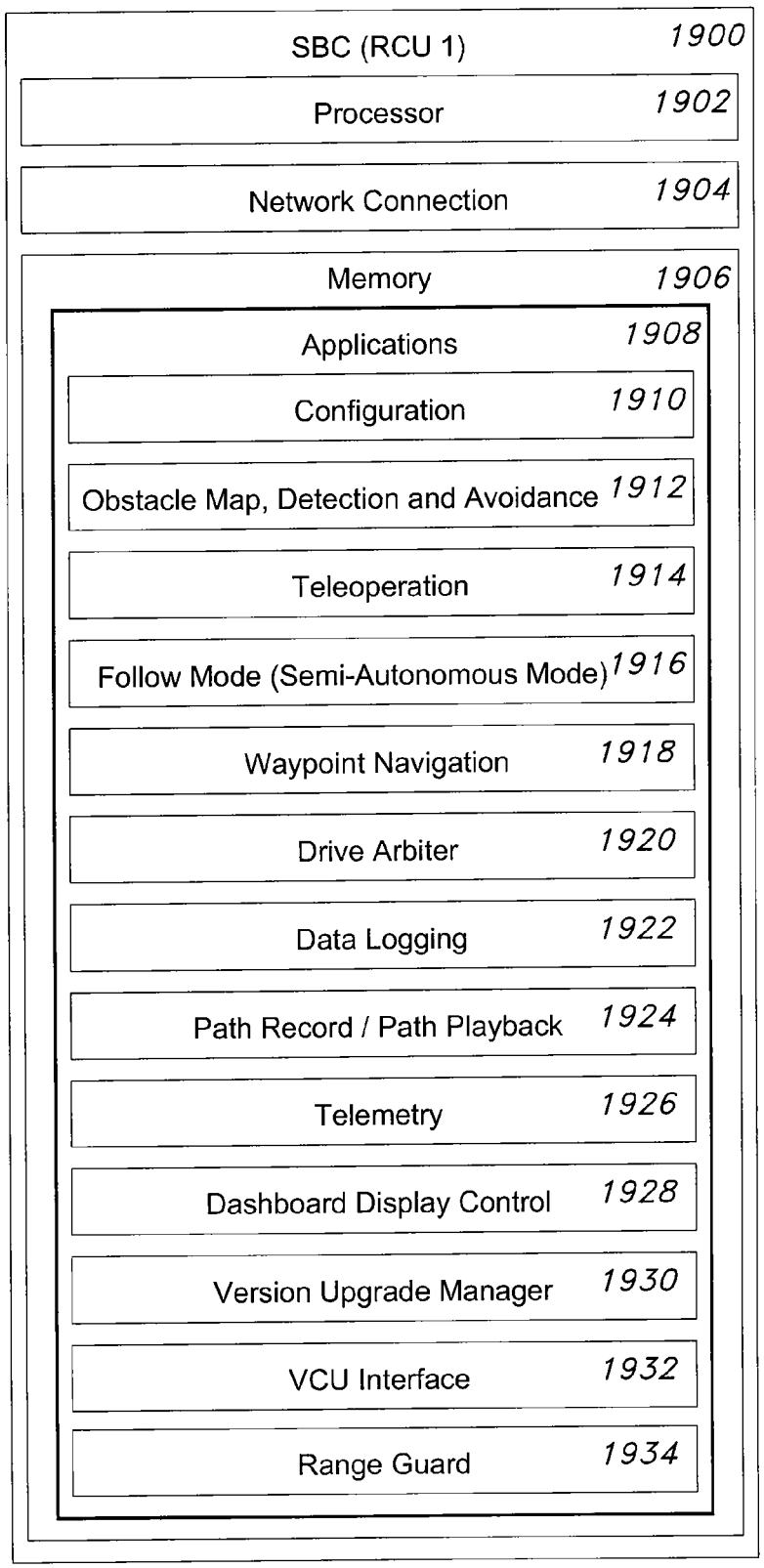
FIG. 19 illustrates a single board computer software architecture for an RCU according to one embodiment of the invention.

FIG. 19 illustrates one embodiment of single board computer (SBC) software architecture for a robotic control unit. The SBC 1900 includes a processor 1902 and network connection 1904. The network connection 1904 may be one or more network connections. Examples of such network connections 1904 include Ethernet TCP/IP, USB, and CAN connection such as J1939.

The network connections 1904 are adapted to connect with a plurality of devices outside of SBC 1900, such that the SBC 1900 can receive and send a plurality of types of data and/or control signals. The RCU may also include a computer-readable medium, such as memory 1906. Memory 1906 may be any type of memory. Examples of memory 1906 include random access memory ("RAM"), read-only memory ("ROM"), optical storage, and magnetic storage. Memory 1906 may include a data storage and/or persistent data storage to store various received or computed data and executable code. Examples of such data and/or control signals received by the SBC 1900 include laser scanner range data, GPS position data, compass orientation data, teleoperation commands from a remote operator control unit (OCU), dashboard display status and input, software upgrades, vehicle status information, vehicle mode switch, and diagnostic commands from CAN diagnostic ports. Examples of such data and/or control signals transmitted by the SBC 1900 include telemetry data to a remote OCU, dashboard display instructions, software updates to other RCUs, files, drive commands to a vehicle control unit, and diagnostic responses to CAN diagnostic port.

As described in more detail below in view of FIGS. 20-28, examples of executable-code include an operating system, such as for example BlueCat Linux, a data transport that includes software, such as for example iRobot AWARE™, to assist in the SBC 1900 communicating with outside devices, and/or applications 1908. The applications 1908 can include one or more RCU functional code and drive behaviors. For example, the applications 1908 may include configuration code 1910 that reads configuration files from storage, such as persistent storage, and puts these values into appropriate locations in the data transport.

The applications 1908 may also include an obstacle map, detection and/or avoidance code 1912. The obstacle map and detection code can receive input range and odometry data and construct a two-dimensional obstacle map. The obstacle avoidance code can receive input trajectories from a drive arbiter 1920 and obstacle data from the two-dimensional obstacle map and scores these trajectories according to obstacle avoidance rules.

Other applications 1908 can include teleoperation code 1914 that receives input commands from a remote OCU and outputs a trajectory set for use by a drive arbiter 1920 and several discrete values. The applications 1908 may also include a follow mode 1916 or semi-autonomous mode that receives obstacle data from the obstacle map to locate a target or object to follow and outputs trajectory sets for use by the Drive Arbiter 1920. Waypoint navigation code 1918 may also be included with applications 1908. The waypoint navigation code 1918 may receive input waypoint values from a chosen path an output a trajectory set for use by the drive arbiter 1920. The drive arbiter 1920 may be included with the applications 1908 to receive input trajectory sets and priorities from various drive behaviors, obstacle data form the obstacle map and configuration data from various configuration publications. The drive arbiter 1920 may also output selected trajectory data to actuators or other devices outside of the SBC 1900.

The applications 1908 may also include data logging code 1922 that can receive status data from vehicle sensors and writes data to a data storage, such as persistent data storage. After receiving an operator command, the data logging code 1922 can copy data wirelessly or on a wireline to an OCU or removable data storage device. The applications may also include path record and path playback code 1924. The path record code can receive location data from vehicle sensors and inputs from an operator and write the data, such as representations of path waypoints, to data storage, such as persistent data storage. The path playback code can receive a path as designated by an operator and play the waypoints included with that path to waypoint navigation.

The applications 1908 may also include telemetry code 1926 that can receive status data from vehicle sensors and sends packets to a remote OCU. A dashboard display control 1928 may also be included on the applications 1908 that can receive status data from vehicle sensors and inputs from a dashboard display and send display instructions to the dashboard display.

The applications 1908 may also include a version upgrade manager 1930, VCU interface 1932, and a range guard application 1934. The version upgrade manager 1930 can receive software upgrades and distribute the software upgrades throughout other RCUs. The VCU interface 1932 can receive driving and diagnostic commands and send driving commands to the VCU via appropriate CAN messages and sends diagnostic messages to other RCUs and returns their reports to the VCU. The range guard application 1934 can detect interruptions of obstacle data from the laser scanner and publish substitute data that indicates obstacles are close in every direction that can be detected by the laser scanner.

Figure 20:
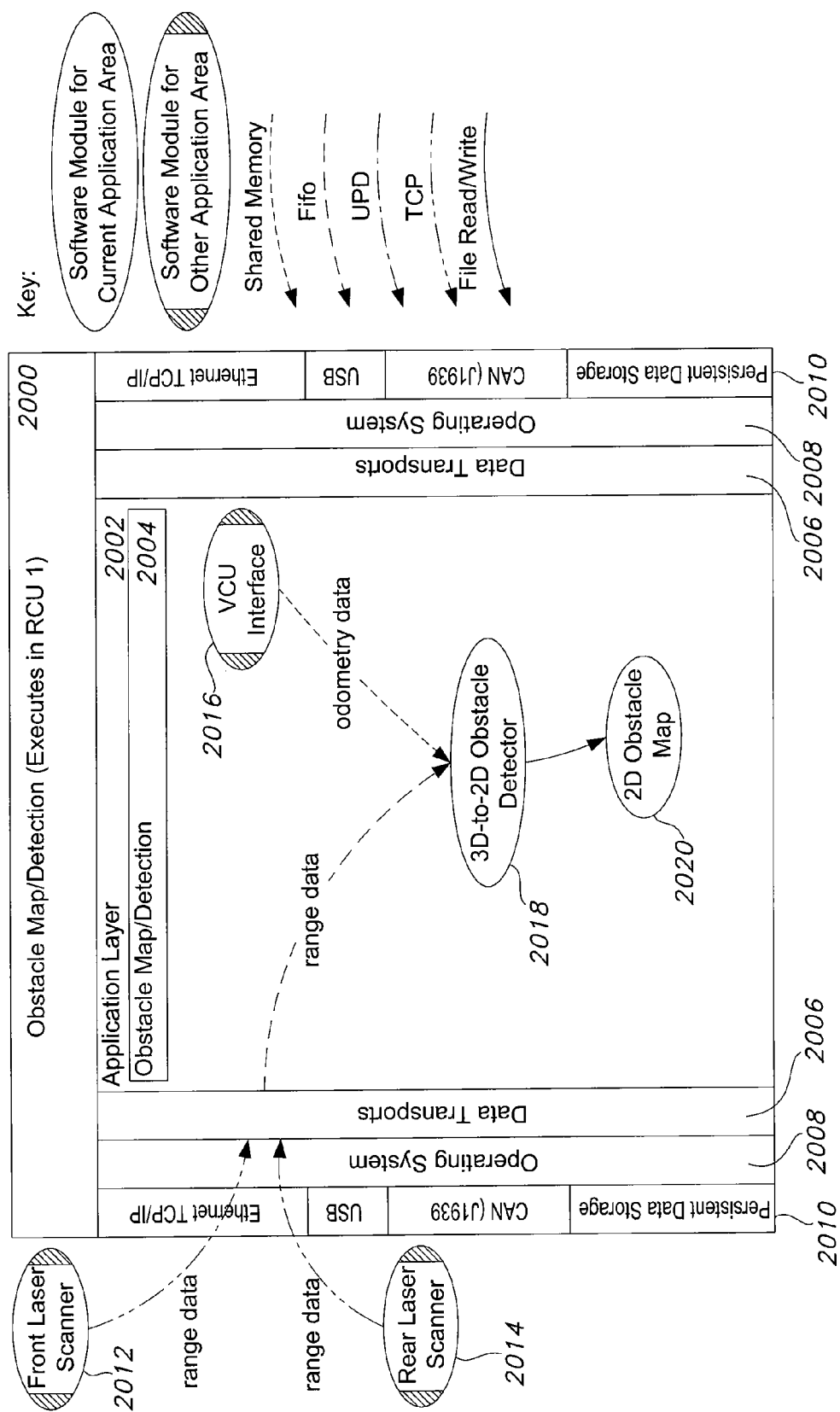
FIG. 20 illustrates an obstacle map/detection function executing in an RCU software architecture according to one embodiment of the invention.

FIGS. 20-28 illustrate certain embodiments of RCU software architecture executing application layer functions and include software modules for a current application area and software modules for other application areas. FIG. 20 shows an obstacle map/detection RCU software architecture 2000. The RCU software architecture includes an application layer 2002 that can include one or more applications, such as obstacle map/detection application 2004, a data transport layer 2006, an operating system layer 2008, and a data storage/network connection layer 2010. The operating system 2008 may include an operating system, such as a Linux operating system. The data storage/network connection layer 2010 may include a data storage, such as persistent data storage, and one or more network connectors, such as CAN, USB, and Ethernet.

In the embodiment shown in FIG. 20, the obstacle map/ detection application 2004 is executed by receiving range data from a front laser scanner 2012 and a rear laser scanner 2014 through a TCP connection. The range data is received by a 3D-to-2D obstacle detector 2018 via a FIFO flow control. The 3D-to-2D obstacle detector 2018 also receives odometry data from a VCU interface 2016 via shared memory. The odometry data may include speed data associated with the vehicle. The 3D-to-2D obstacle detector 2018 uses the range data and odometry data to generate a 2D obstacle map 2020.

Figure 21:
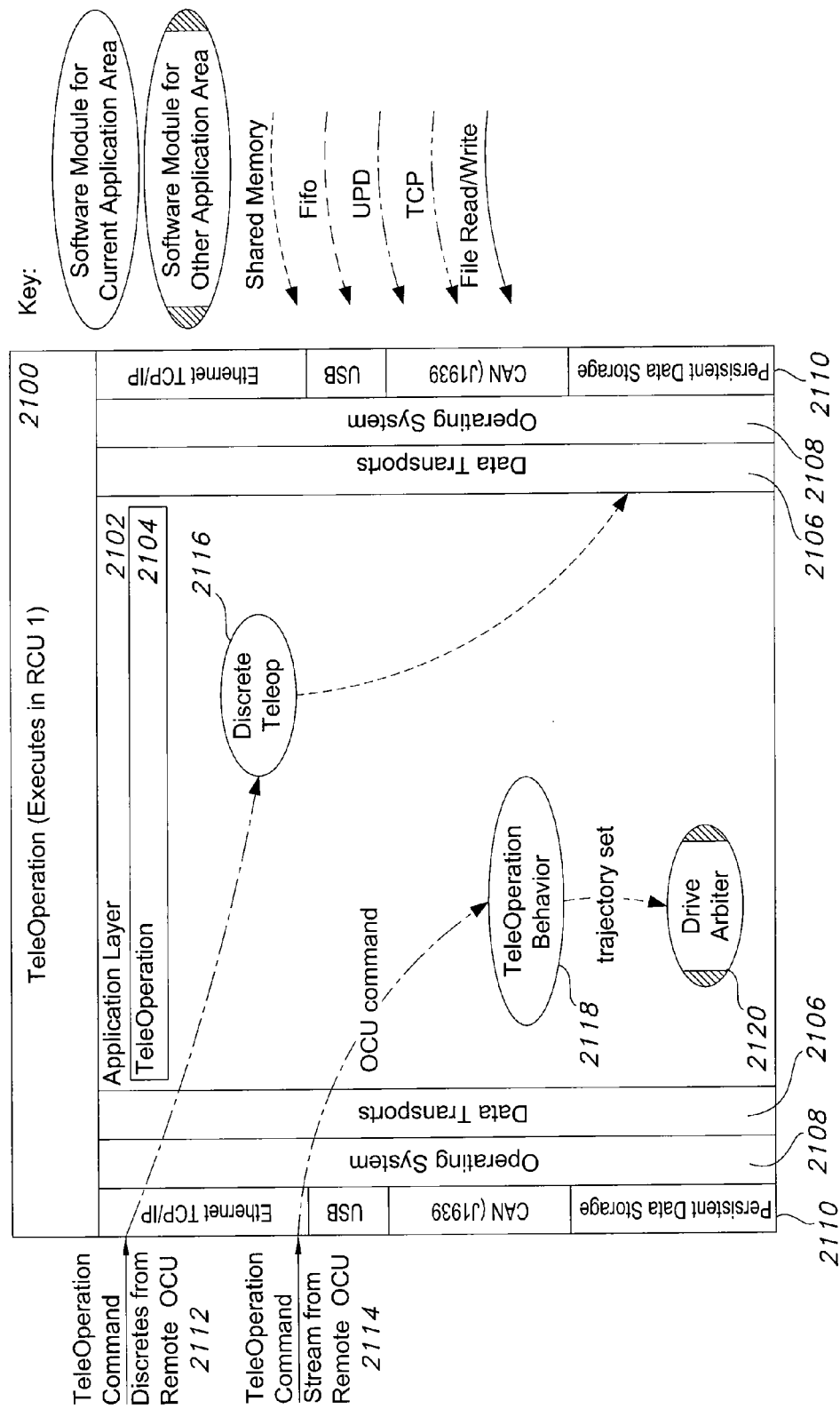
FIG. 21 illustrates a teleoperation function executing in an RCU software architecture according to one embodiment of the invention.

FIG. 21 illustrates one embodiment of a teleoperation executing in an RCU 2100. The teleoperation application 2104 may receive input commands from a remote OCU and output a trajectory set for a drive arbiter and several discrete values. The teleoperation application 2104 may execute by receiving teleoperation command discrete data from a remote OCU via an Ethernet connector and a protocol, such as a user datagram protocol (UDP) at a discrete teleop 2116. The discrete teleop 2116 receives the commands from the OCU and publishes them as data for discrete commands such as gears, follow behavior on/off, starter, fuel cut-off, horn, override obstacle avoidance, turn path recording on/off, add point to current path, select path to replay, and replay path in reverse order. A teleoperation behavior 2118 receives a teleoperation command stream from a remote OCU 2114 via an Ethernet connector and UDP. The teleoperation behavior 2118 outputs a trajectory set based on the command stream 2114 to a drive arbiter 2120.

Figure 22:
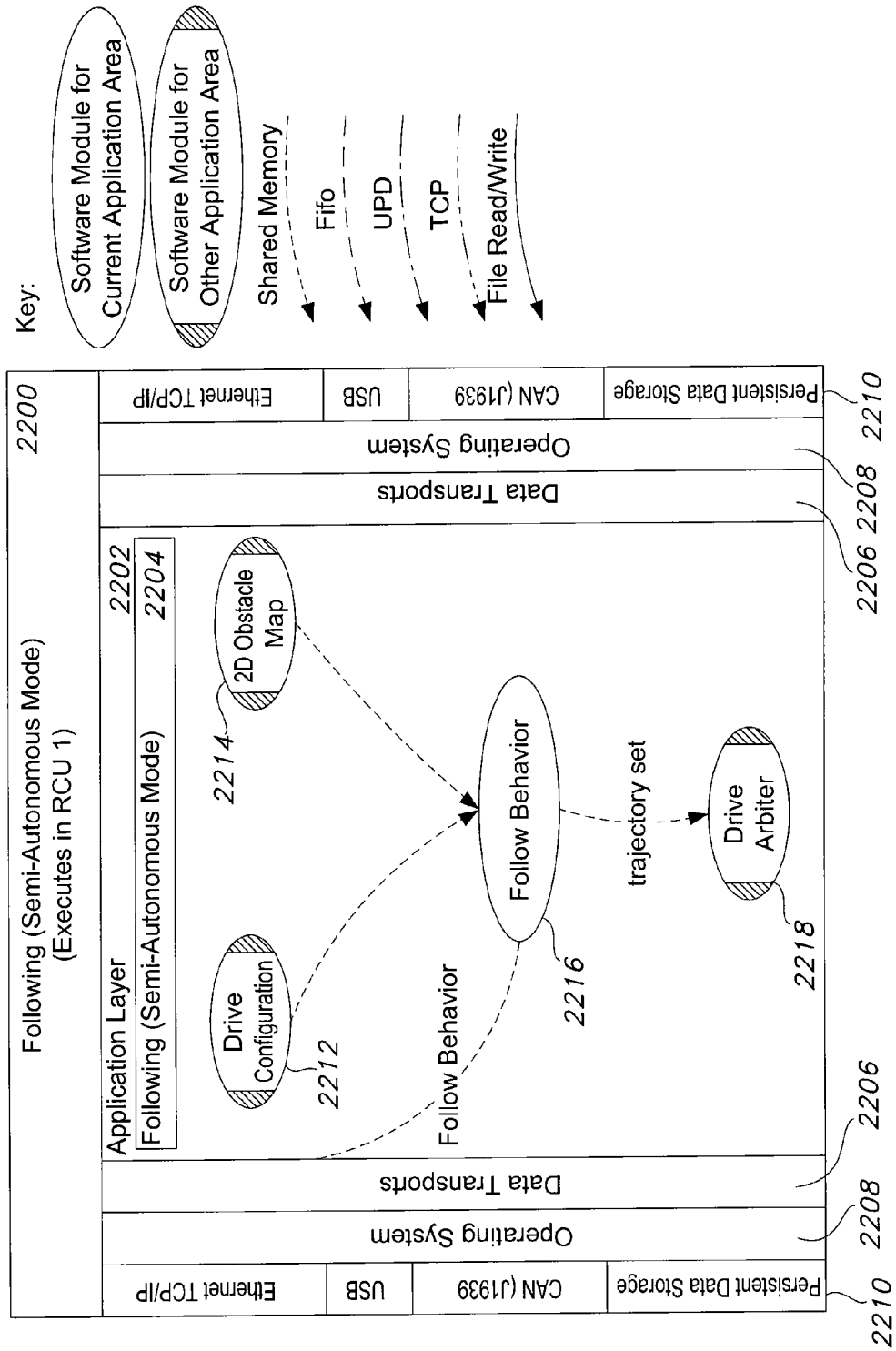
FIG. 22 illustrates a following mode function executing in an RCU software architecture according to one embodiment of the invention.

FIG. 22 illustrates one embodiment of a following (semi-autonomous mode) executing in an RCU software architecture 2200. The RCU architecture 2200 includes an application layer 2202 having a following (semi-autonomous mode) 2204 application that can take obstacle data from the obstacle map to locate a leader and output a trajectory set for use by the drive arbiter. The following (semi-autonomous mode) 2204 executes by including a follow behavior 2216 function that receives data from a drive configuration 2212 and a 2D obstacle map 2214 via shared memory. The follow behavior 2216 also receives a follow behavior, such as from an operating system 2208 or from an outside device, such as an OCU. The follow behavior 2216 generates a trajectory set based on the received data and provides the trajectory set to a drive arbiter 2218.

Figure 23:
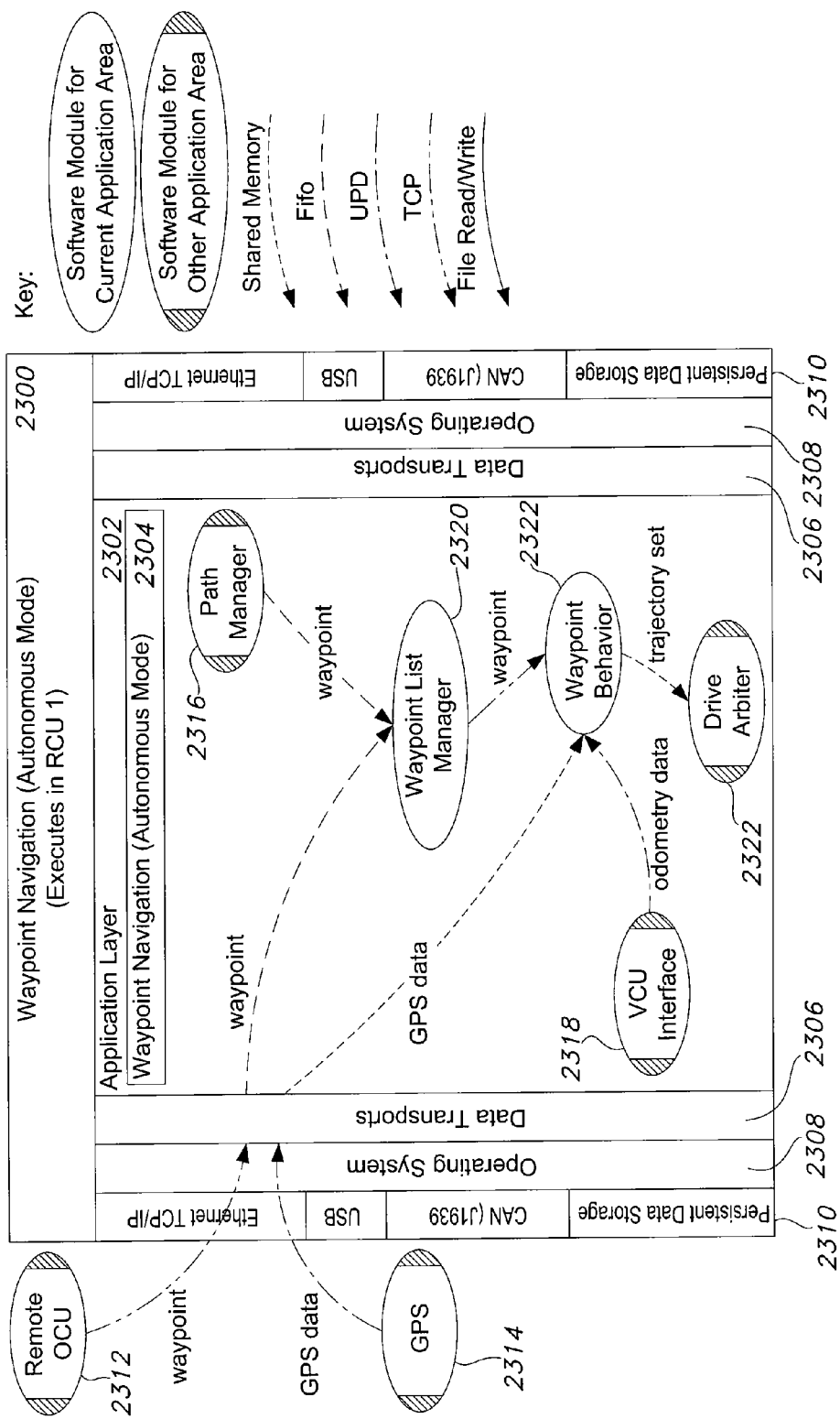
FIG. 23 illustrates a waypoint navigation function executing in an RCU software architecture according to one embodiment of the invention.

FIG. 23 illustrates one embodiment of a waypoint navigation (autonomous mode) executing in RCU software architecture 2300. The RCU software architecture 2300 includes an application layer 2302 that includes a waypoint navigation (autonomous mode) application 2304 that can receive input waypoint values from a chosen path and output a trajectory set for use by a drive arbiter 2322. The waypoint navigation executes by receiving waypoints from a remote OCU 2312 via an Ethernet connection and TCP communication protocol to a waypoint list manager 2320 via FIFO and GPS data from a GPS 2314 via the Ethernet connection and a UDP protocol to a waypoint behavior. The waypoint list manager 2316 also receives waypoints from a path manager 2316 via FIFO. The waypoint list manager 2316 of some embodiments includes only one input FIFO and both the path manager 2316 and remote OCU 2312 write to the FIFO input. The waypoint list manager 2320 provides waypoint data to a waypoint behavior 2322 via TCP. The waypoint behavior 2322 also receives odometry data from a VCU interface 2318 via UDP and generates a trajectory set that is provided to a drive arbiter.

Figure 24:
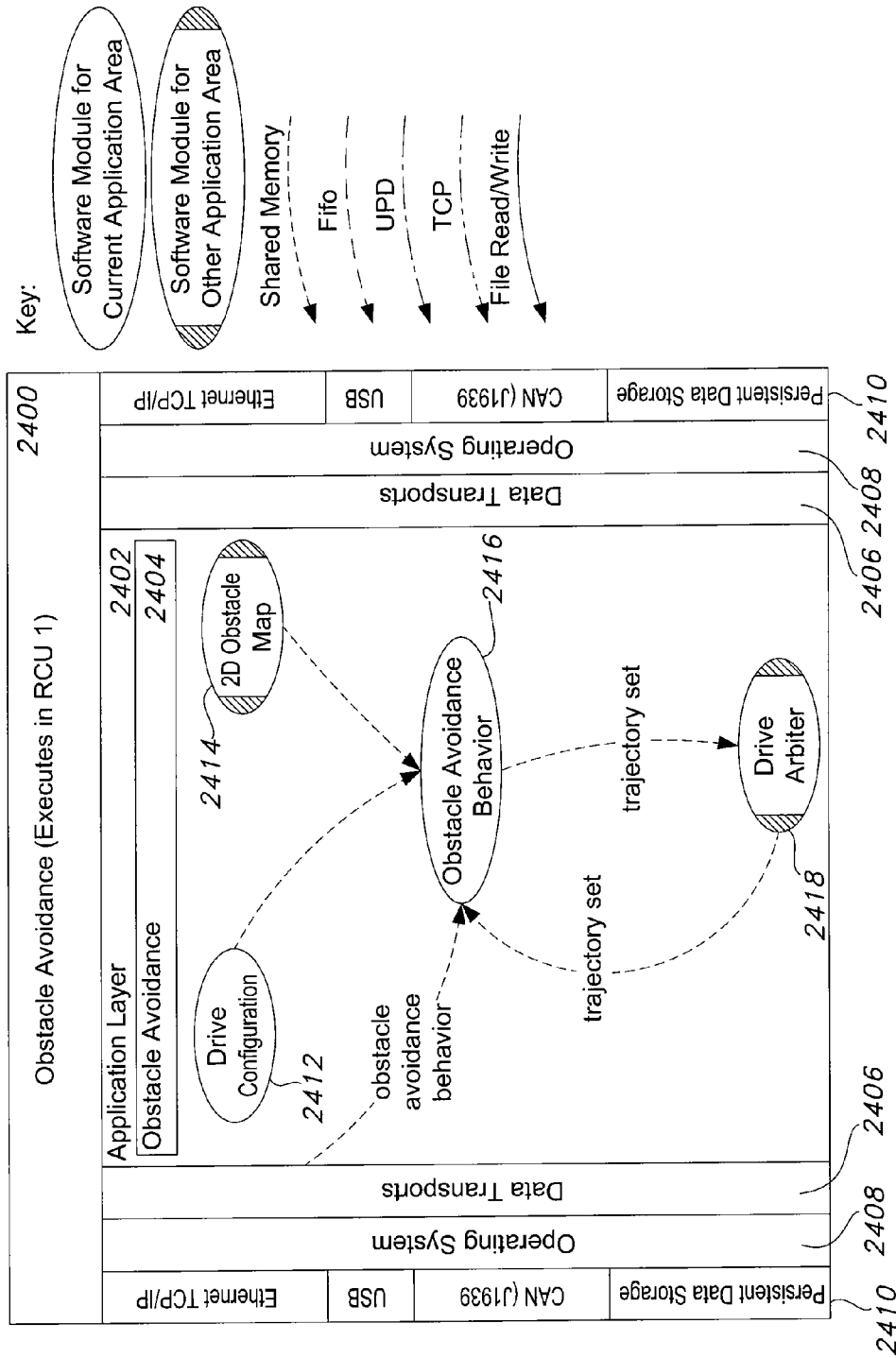
FIG. 24 illustrates an obstacle avoidance function executing in an RCU software architecture according to one embodiment of the invention.

FIG. 24 illustrates one embodiment of an obstacle avoidance executing in an RCU software architecture 2400. The RCU software architecture 2400 includes an application layer 2402 that includes an obstacle avoidance application 2404. The obstacle avoidance application 2404 can receive input trajectories from a drive arbiter 2418 and obstacle data from a 2D obstacle map 2414 and score the trajectories according to obstacle avoidance rules. The obstacle avoidance application 2404 includes an obstacle avoidance behavior code 2416 that receives data from a 2D obstacle map 2414, configuration data from a drive configuration 2412, obstacle avoidance behavior from an operating system 2408 and/or outside device, such as an OCU, and input trajectory sets from the drive arbiter 2418. The obstacle avoidance behavior code 2416 scores the trajectory sets based on the configuration data, obstacle map data, and obstacle avoidance behavior and provides the trajectory set to the drive arbiter 2418.

Figure 25:
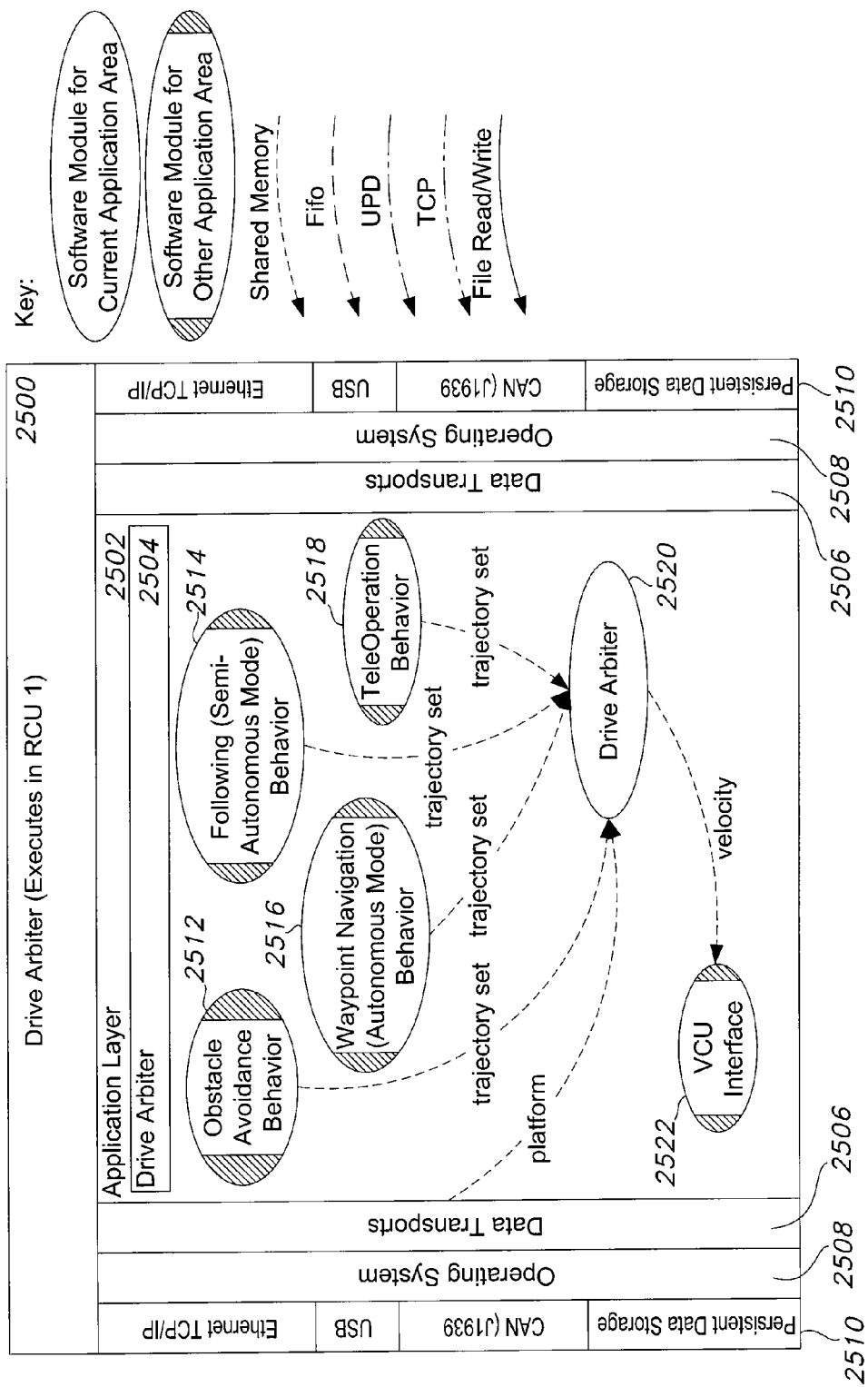
FIG. 25 illustrates a drive arbiter function executing in an RCU software architecture according to one embodiment of the invention.

FIG. 25 illustrates one embodiment of a drive arbiter executing in an RCU software architecture 2500. The RCU software architecture 2500 includes an application layer 2502 having applications, such as a drive arbiter 2504. The drive arbiter 2504 can receive trajectory sets and priorities from various drive behaviors, obstacle data from the obstacle map, and configuration data from various configuration publications and output selected trajectory sets. Embodiments of the drive arbiter can operate between 20 and 100 Hz. In one embodiment the drive arbiter operates at 20 Hz. The drive arbiter application 2504 includes drive arbiter code 2520 that receives trajectory sets from a plurality of functions such as obstacle avoidance behavior 2512, waypoint navigation (autonomous mode) behavior 2516, following (semi-autonomous mode) behavior 2514, and teleoperation behavior 2518 via shared memory or otherwise. The drive arbiter 2520 also receives platform data via shared memory from an operating system 2508 or outside device. Based on the received data, the drive arbiter 2520 can generate velocity or other commands and provides the command to a VCU interface 2522. The VCU interface 2522 can communicate the commands to a VCU or otherwise.

Figure 26:
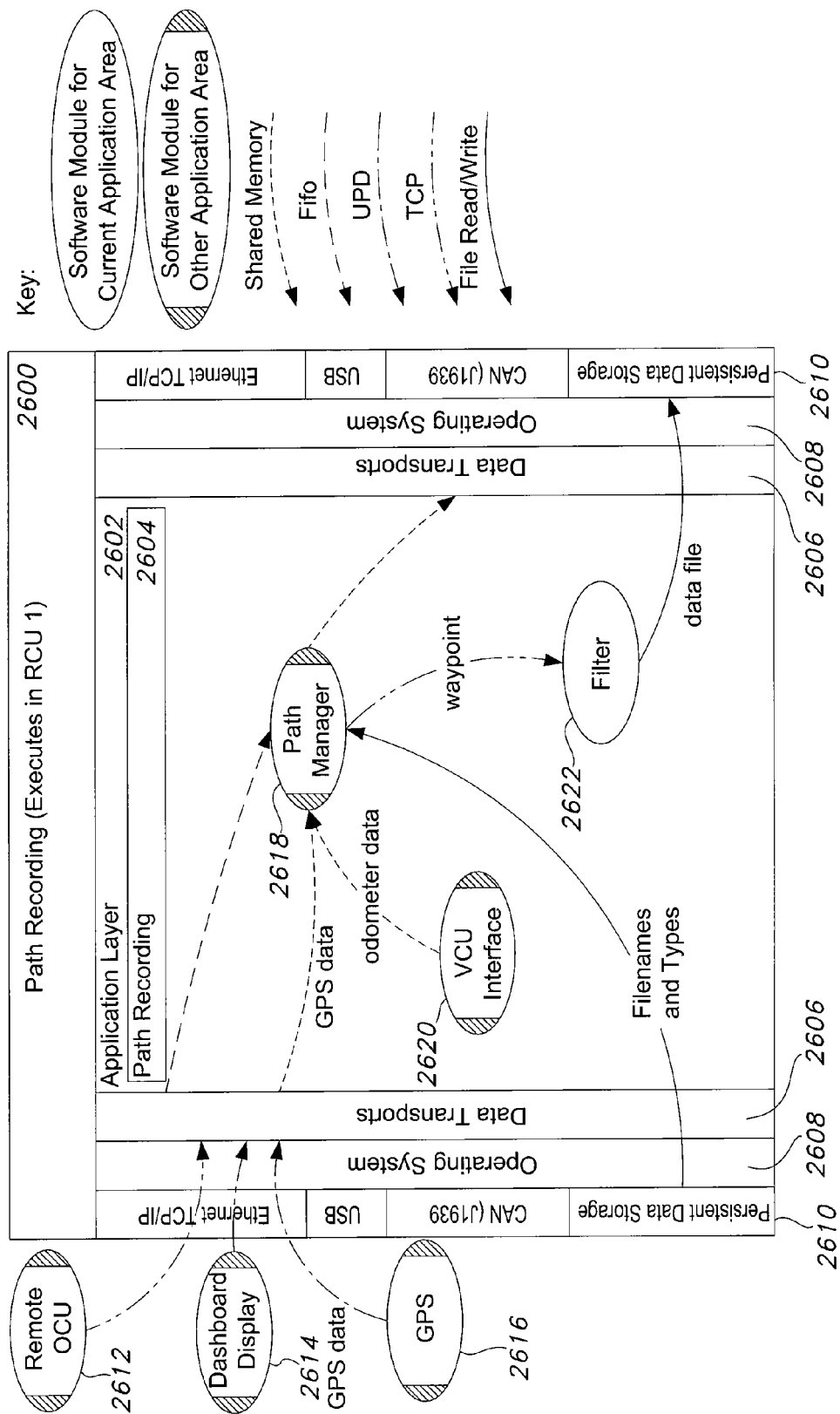
FIG. 26 illustrates a path recording function executing in an RCU software architecture according to one embodiment of the invention.

FIG. 26 illustrates one embodiment of a path recording executing in an RCU software architecture 2600. The RCU software architecture 2600 includes an application layer 2602 having a path recording application 2604. The path recording application 2604 can take location data from vehicle sensors and inputs from an operator and write data to a persistent data storage that represents the waypoints for a path. For example, path manager code 2618 may be provided that can receive commands from a remote OCU 2612 and/or dashboard display 2614 via an Ethernet connection. The commands may include record new path, record waypoint, cancel new path, and save new path. The path manager code 2618 may also receive GPS data from a GPS 2612 and filenames and types from a persistent data storage included on a data storage/network connection layer 2610. The path manager 2518 can send data such as number of existing path files, names of existing path files, name of path file currently being used, and path manager state to a data transport layer 2606. The path manager 2618 may also send waypoint data through a filter 2622 to the persistent data storage.

Figure 27:
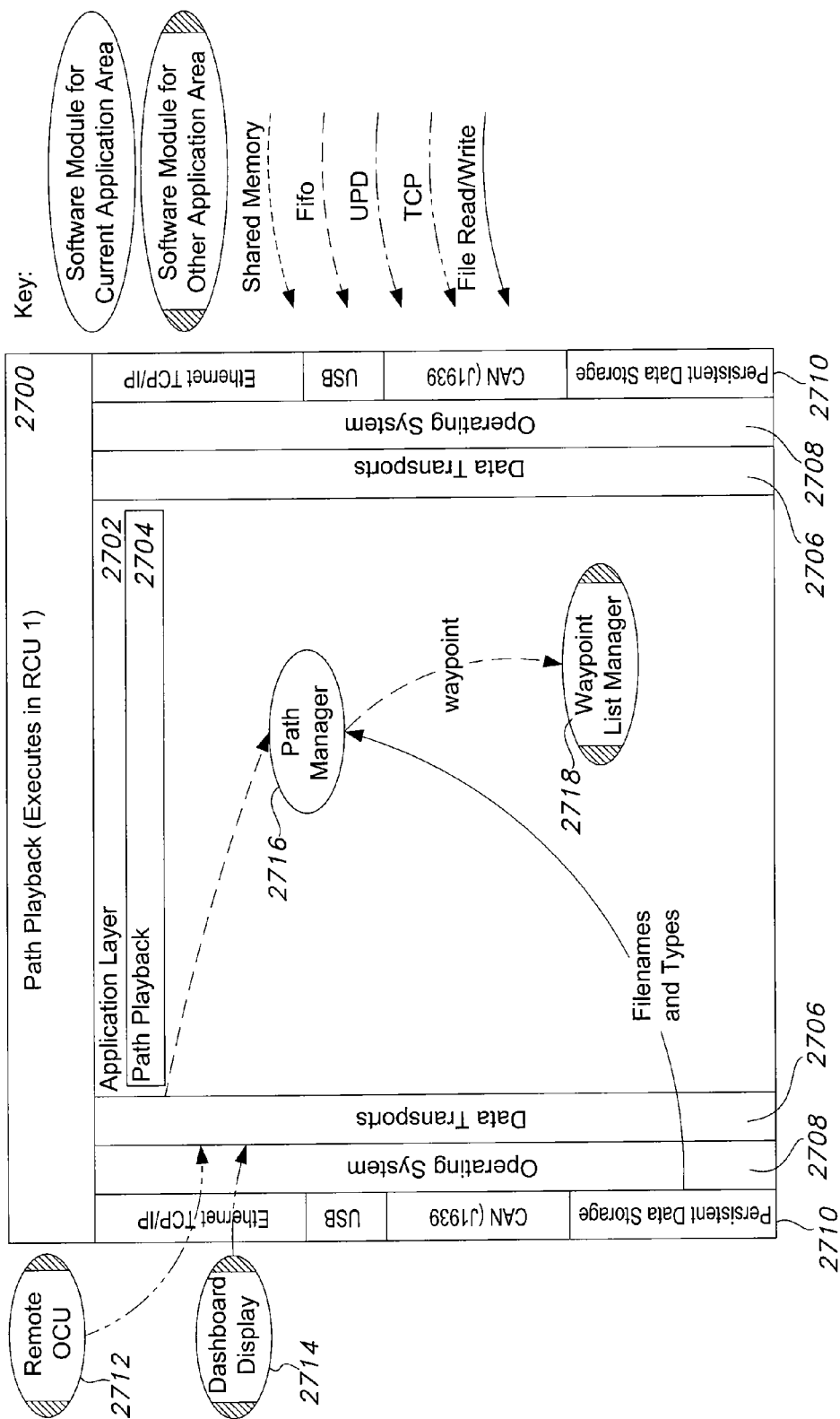
FIG. 27 illustrates a path playback function executing in an RCU software architecture according to one embodiment of the invention.

FIG. 27 illustrates one embodiment of a path playback executing in an RCU software architecture 2700. The RCU software architecture 2700 includes an application layer 2702 that can include applications, such as a path playback application 2704. The path playback application 2704 can receive a path designated by an operator and play the waypoints that include that path to a waypoint navigation. For example, path manager code 2716 may receive commands, such as play path and path name, from a remote OCU 2712 and/or dashboard OCU, such as dashboard display 2714. The path manager 2716 may also receive filenames and types from a persistent data storage. The path manager 2716 may generate waypoints to a waypoint list manager 2718 that can communicate with a waypoint navigation application (not shown).

Figure 28:
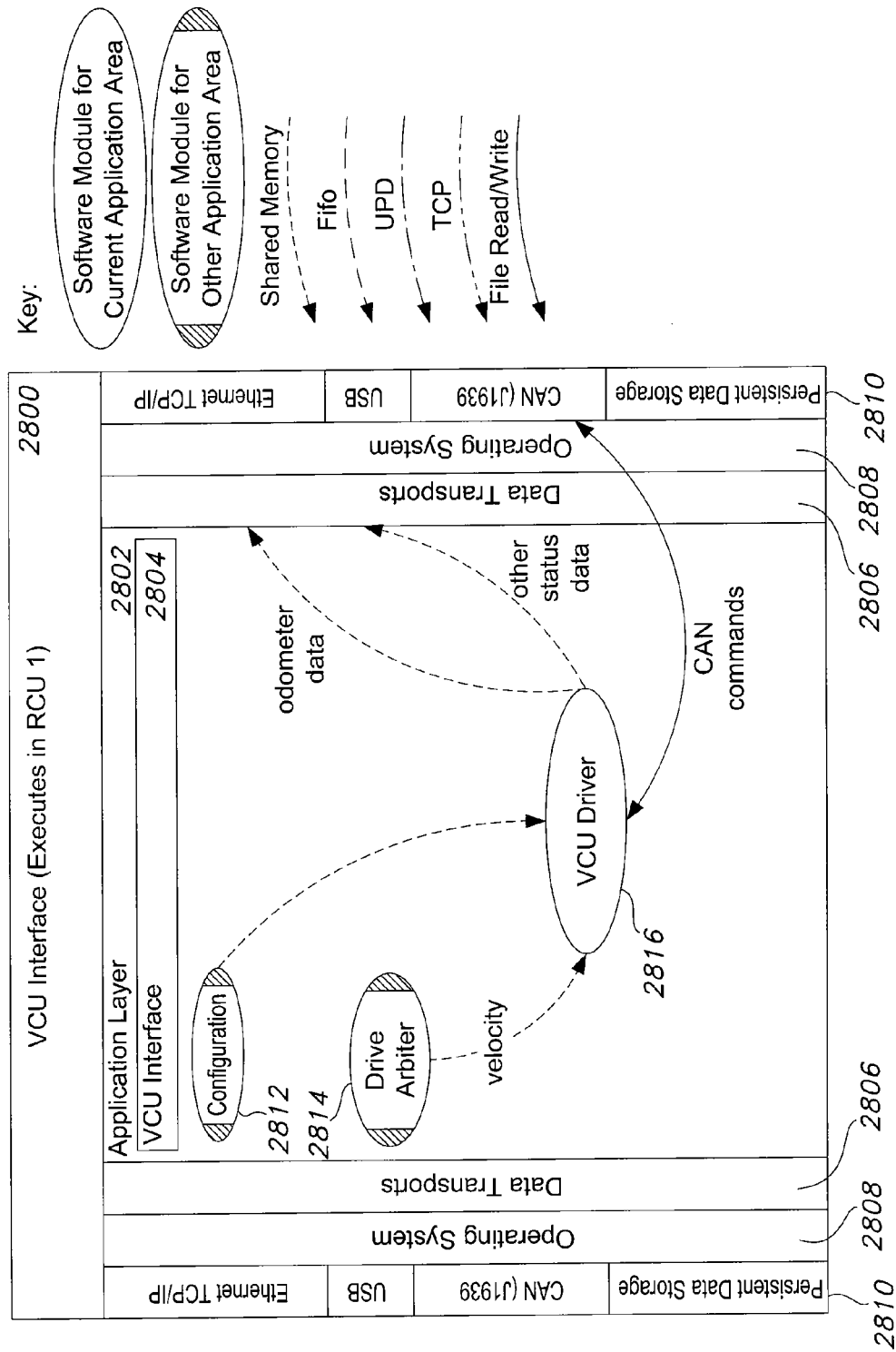
FIG. 28 illustrates a VCU interface function executing in an RCU software architecture according to one embodiment of the invention.

FIG. 28 illustrates one embodiment of a VCU interface executing in an RCU software architecture 2800. The RCU architecture 2800 may include an application layer 2802 having applications, such as VCU interface 2804. The VCU interface application 2804 can receiving driving and diagnostic commands and send driving commands to a VCU via appropriate CAN messages, send diagnostic messages to other RCUs, and return reports to the VCU. The VCU interface application 2804 may include a VCU driver 2816 that receives configuration data from a configuration 2812, and velocity or other vehicle commands from a drive arbiter 2812 and sends odometry data and/or other status data to a data transport layer 2806 and CAN commands to a VCU via a CAN connector on a data storage/network connection layer 2810. The VCU driver 2816 can also receive status information from the VCU via the CAN connection.

Illustrative Vehicle

Embodiments of the present invention may be used in a variety of vehicles, such as automobiles, trucks, utility vehicles and any other suitable autonomous vehicle. As explained above, multiple robotic control modules can be used in a robotic control system of a vehicle or mobile platform. The robotic control modules can work together, such as for example as explained with reference to FIGS. 1 and 2A-B, to distribute the processing and computing of the robotic control system.

Figure 3:
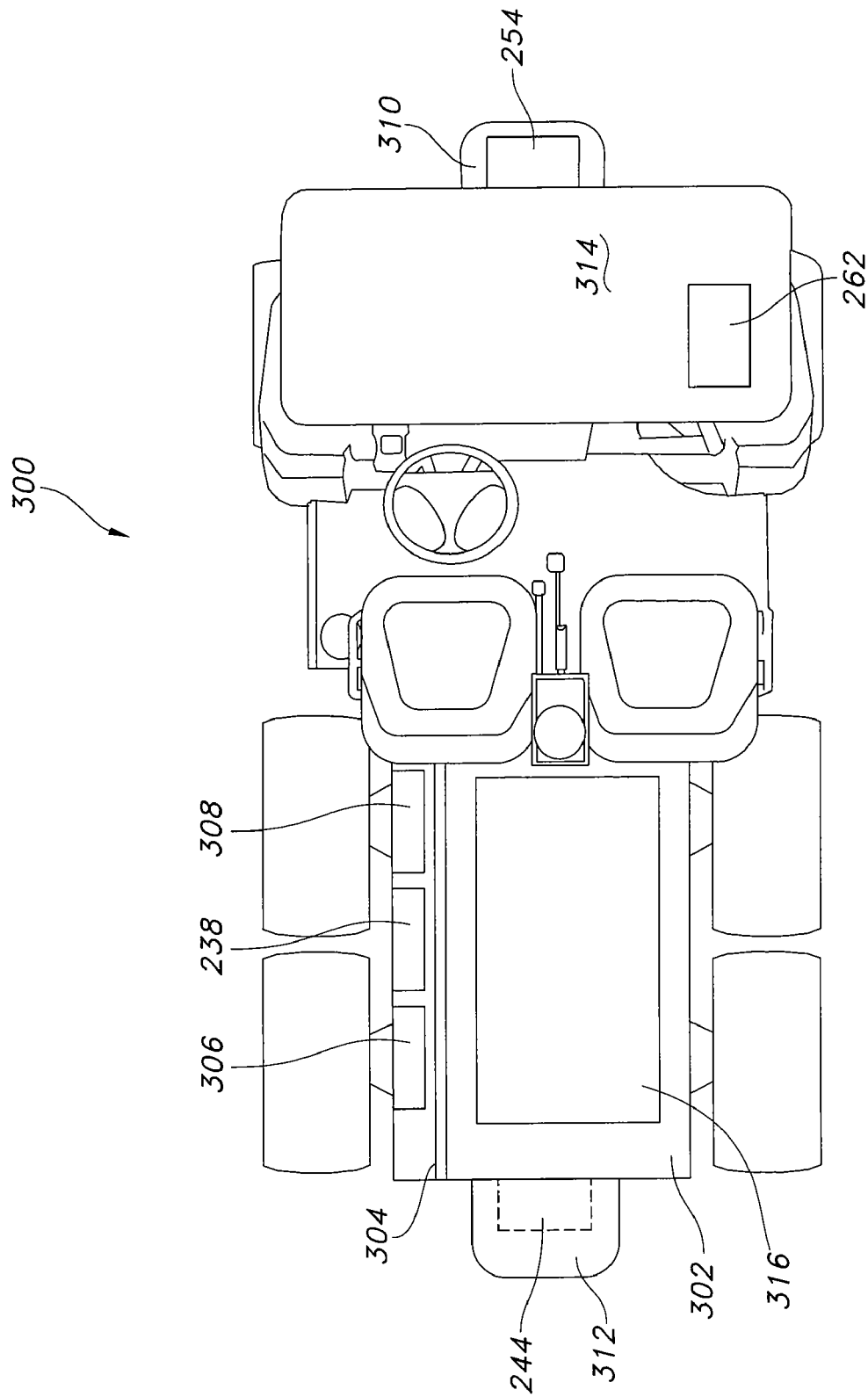
FIG. 3 is a top view of an illustrative vehicle including robotic control modules according to one embodiment of the present invention.
Figure 4:
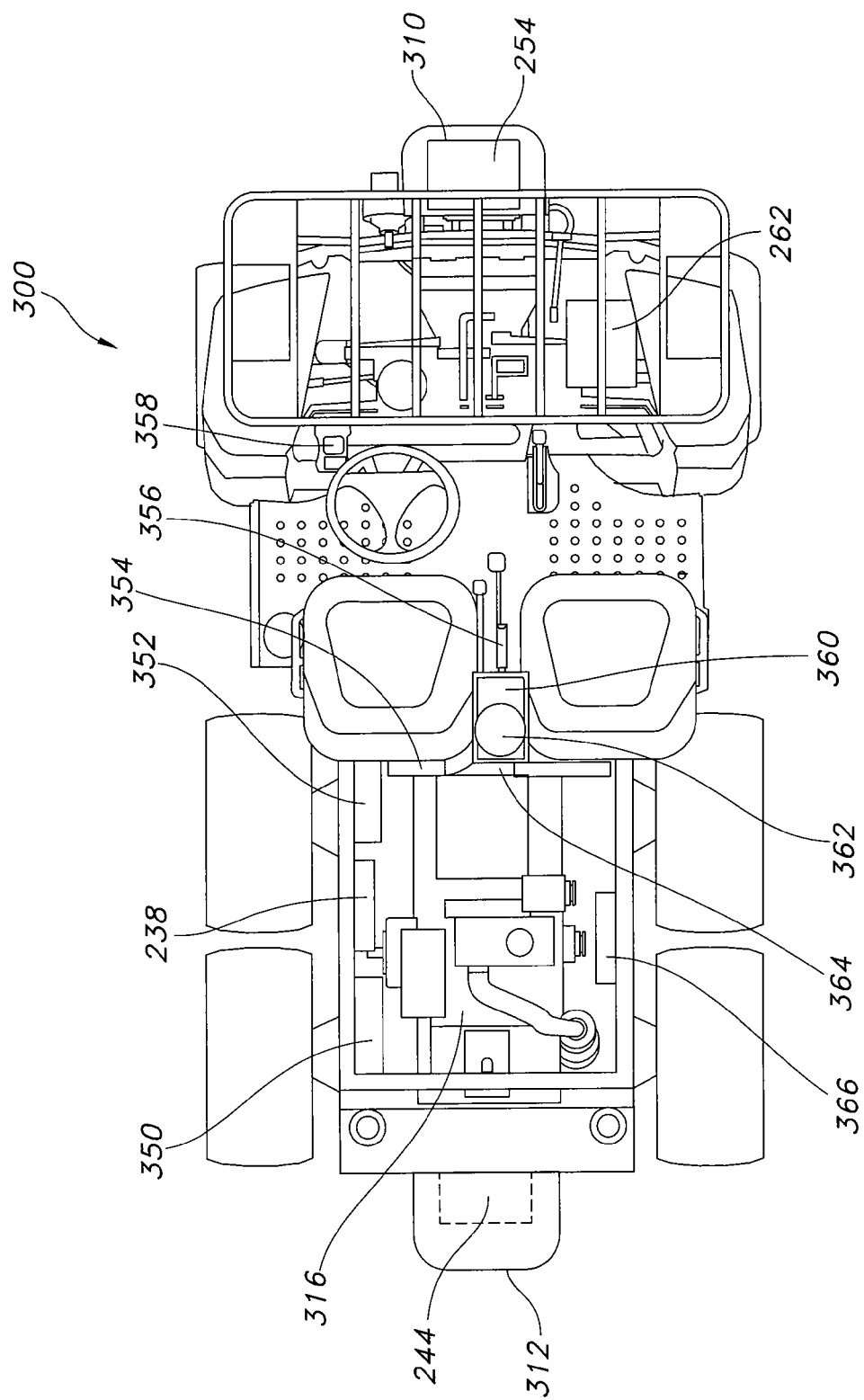
FIG. 4 is a top view of the illustrative vehicle of FIG. 3 including an engine and robotic control modules according to one embodiment of the present invention.

FIGS. 3 and 4 are top view diagrams of an illustrative vehicle in one embodiment of the present invention. The vehicle 300 shown in FIGS. 3 and 4 is a six wheeled, diesel powered utility vehicle, such as the John Deere™ Gator™ (www.deere.com). Note that FIG. 3 and illustrate the vehicle 300 having an engine 316 and with the dump bed at the rear of the vehicle 300 removed. Embodiments of the present invention provide a distributed robotic control system for a robotic vehicle, such as vehicle 300, or mobile platform includes a robot platform having a body and an engine or motor 316 connected to a drive, a defined set of robotic control routines selected from behavior arbitration and behaviors; sensor drivers; drive/actuator controllers; database management and databases, or data converters. The vehicle may also include a plurality of interchangeable mountable modules 238, 244, 254, 262, each interchangeable mountable module 238, 244, 254, 262 including a power input, a plurality of network connectors, and a multi-pin connector available on the exterior of the interchangeable mountable module, and each interchangeable mountable module including a microprocessor board with code execution dynamic memory (e.g., SDRAM). The microprocessor board may further include a plurality of protocol transceivers. The multi-pin connector may be capable of communicating with the plurality of protocol transceivers sensors. The microprocessor board may also include a nonvolatile memory having executable code. Each microprocessor board of a interchangeable mountable module may be configurable to execute a selected part of the executable code. A packet network switch may also be included. Each of the plurality of network connectors may be capable of connection to a packet network distributed through the body and communicating with the packet network switch. The packet network may be capable of relaying instructions for or from the microprocessor board. The plurality of microprocessor boards can be provided with instructions to load and execute discrete ones of the defined set of robotic control routines, as shown in different software architectures of different RCUs in FIGS. 19-28, such that the defined set of robotic control routines are executed among the plurality of interchangeable mountable modules.

The robotic control modules, systems, and methods as described, however, is generally applied by a simple mechanic of one RCU 238, 244, 254, or 262 per actuator, using the available RCUs 238, 244, 254, 262 then for sensors, computation, and communications. Additional RCUs can be added just for additional sensors, computation, or communications, without driving an actuator. Indeed, the RCUs 238, 244, 254, 262 can be used to control only sensors, computation, and/or communications. This applies to any vehicle of any size or configuration, including small electric vehicles with as little as one or two actuators (e.g., skid steered) or agricultural or construction vehicles with many more (e.g., an actuator for every control in a complex construction vehicle). The RCUs 238, 244, 254, 262 are networked and operate in the same manner as discussed herein.

The illustrative vehicle 300 includes a robotic control system having a number of robotic control modules 238, 244, 254, 262 each contained in a mountable housing that may be used to control the operation systems, such as a throttle system, a steering system, a braking system, and a shifting system. In this embodiment, the robotic control modules 238, 244, 254, 262 are distributed throughout the vehicle in idle spaces in the vehicle. Idle spaces can exist as void spaces that are unused on the vehicle prior to installation of the robotic control system (as shown in FIGS. 3-4). In this manner, valuable person or payload space is not taken up by the electronics of the robotic control system. For example, robotic control module 1 238 is positioned in the engine compartment 302 of the vehicle 300. A heat shield 304 may be used to shield the robotic control module 1 238 and other electronics 306, 308 from the heat of the engine. In one embodiment, the heat shield 304 can have a seal on its top surface so that it can form a seal with the bottom surface of the dump bed (not shown).

The robotic control modules 238, 244, 254, 262 may each have different functions. For example, one robotic control module may control an operation system (i.e., a system for operation of a vehicle) and another robotic control module may perform supervisory functions. In one embodiment, each robotic control module is capable of performing any of the different functions depending on its placement in the vehicle. Other embodiments of the same or different vehicles may have more or less robotic control modules.

The robotic control module 2 254 can be positioned on the front laser scanner assembly 310. The robotic control module 3 244 can be positioned on the rear laser scanner assembly 312. The robotic control module 4 262 can be positioned in the hood cavity 314 of the vehicle. The position of the robotic control modules in the idle spaces shown in FIGS. 3 and 4 are illustrative and a variety of other configurations are possible. Positioning and mounting the robotic control modules near the devices that they send control signals to and receive signals from can reduce noise interference with these signals. FIG. 4 also illustrates the layout of various other electronic components of the robotic control system of the vehicle 300 according to one embodiment of the present invention. Examples of such other components include a battery equalizer 350, GPS 352, VCU 354, cameras 358, compass 360, radios 362, power center 364, and controller 366.

Obstacle Detection/Obstacle Avoidance System

As stated above, the vehicle is equipped with an Obstacle Detection/Obstacle Avoidance (ODOA) system which is designed to detect obstacles external to the vehicle, and to initiate the proper control actions to avoid them. The vehicle ODOA system comprises both hardware and software components, and is designed to be fail-safe without limiting the ability for external operators to fully control the vehicle under conditions of operational military necessity. In one such embodiment, the vehicle comprises the following components: (i) a forward nodding laser scanner assembly; (ii) a rear laser scanner assembly; (iii) a robotic control unit having a memory comprising executable code such as a range guard application and a control (or drive arbiter) application; and (iv) an obstacle map. Other types of scanners, other than laser, and sensors may also be utilized in the system, such as those capable of generating a particle map or cone of range vectors, e.g. perception. Examples of such sensors and scanners include Flash LIDAR, stereovision, radar, and sonar.

Figure 5A:
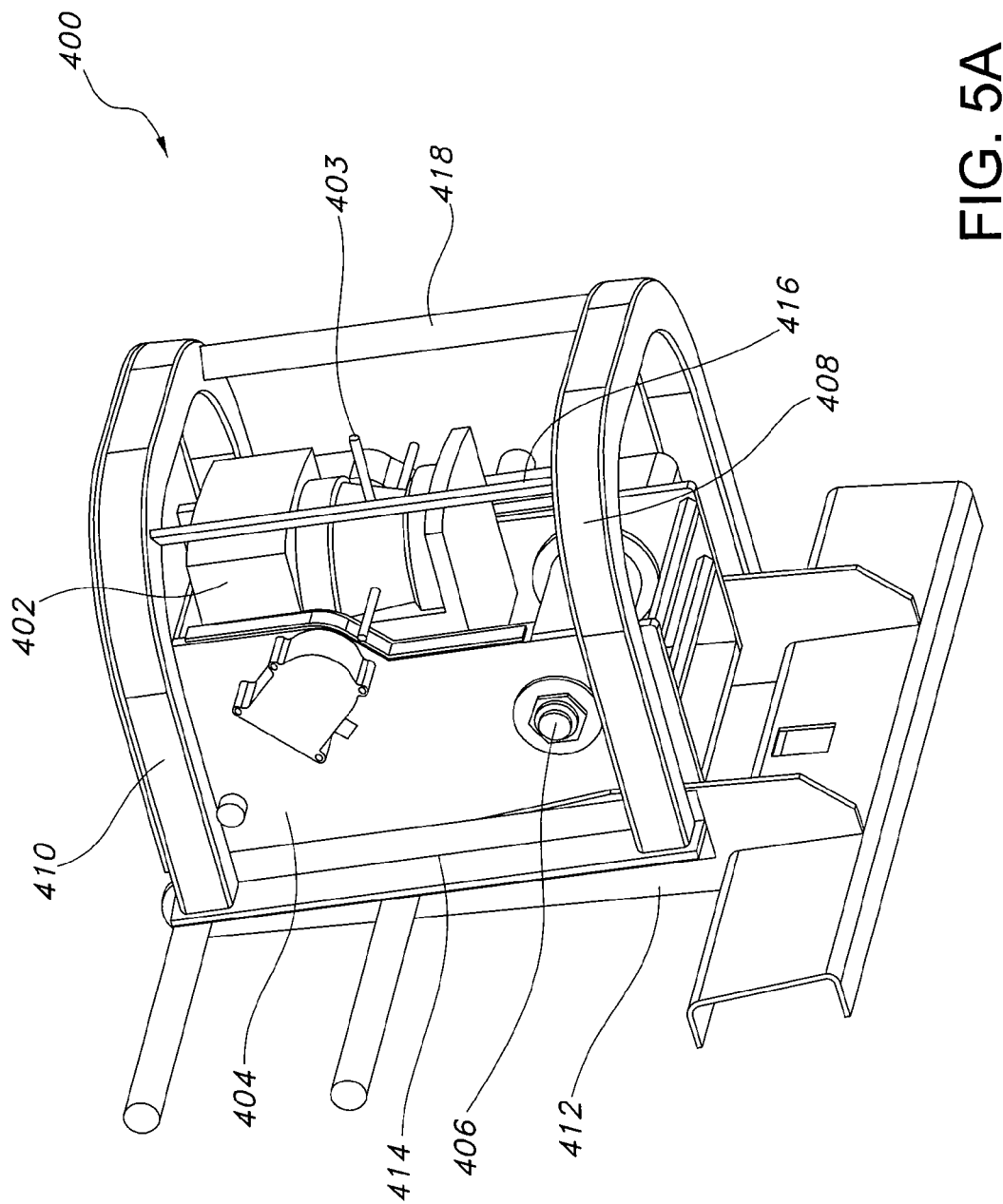
FIGS. 5A-B show a laser scanner having a protective guard according to one embodiment of the present invention.
Figure 5B:
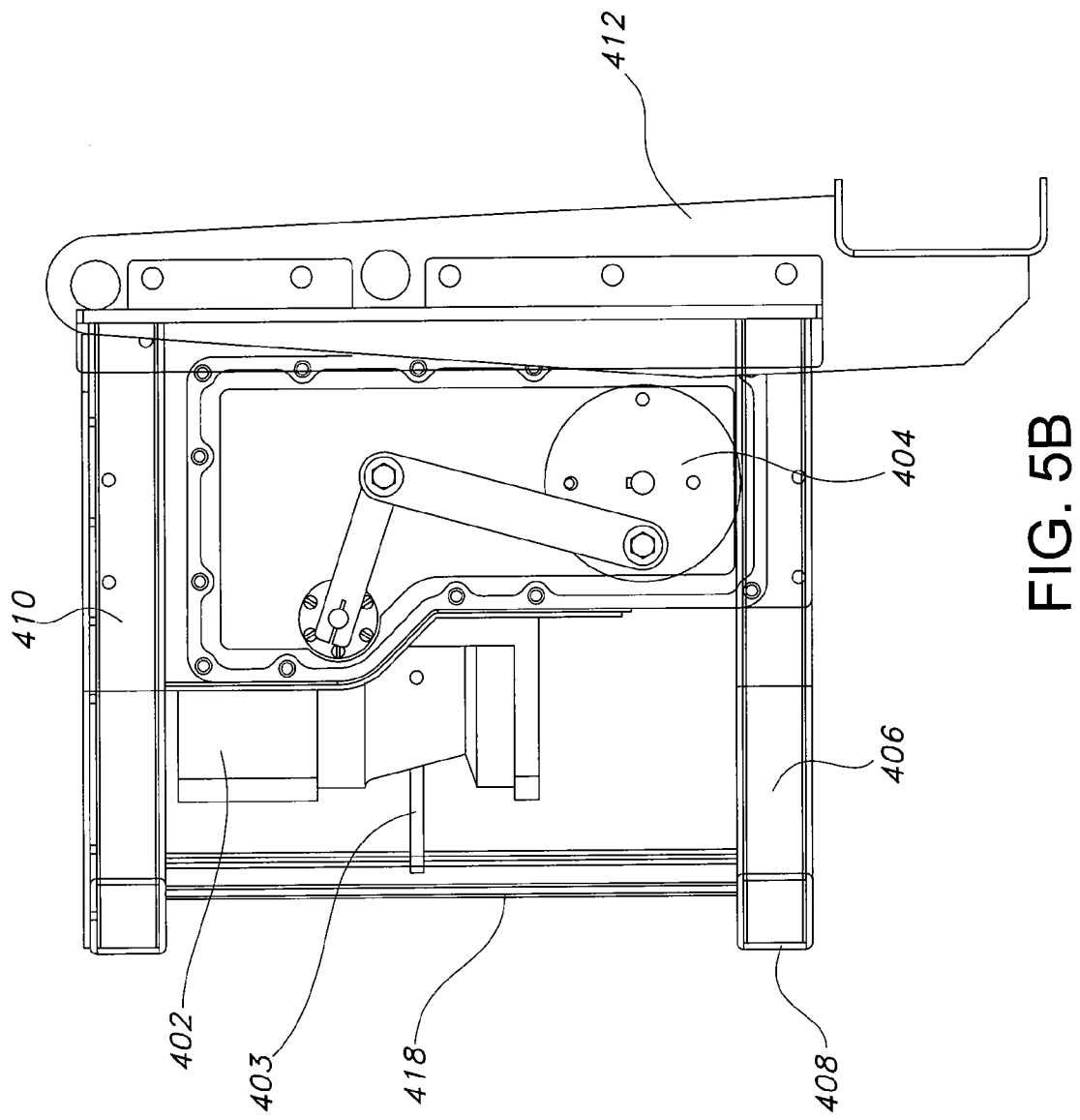

Referring now to FIGS. 5A-B, illustrated is a front nodding laser scanner 400 according to one embodiment of the present invention. The front nodding laser scanner 400 is generally located on the front of the vehicle and includes a laser scanner 402 for transmitting a laser beam 403 to detect the presence of an obstacle, a scanner mechanism 404 for manipulating the position of the laser scanner 402 and consequently the direction of the laser beam 403, a protective guard 406 for preventing the front nodding laser scanner 400 from being damaged. One example of such laser scanner 402 is an LMS-291 laser scanner manufactured by SICK, Minneapolis, Minn. In addition, or alternatively, to the laser scanner 402, a LADAR/LIDAR may be used generate a point cloud and/or depth map. The LADAR/LIDAR may also provide radar, stereoscopic vision, and other sensor functionality that can be used to generate the point cloud and/or depth map. In some embodiments, the LADAR/LIDAR may be interchangeable with the laser scanner 402.

A forward nodding laser scanner assembly according to some embodiments of the present invention can gather "true" or interpolated 3D data about obstacles in front of the vehicle and passes that data to onboard computers, such as a single board computer associated with a robotic control unit for processing. The forward laser scanner unit 400 nods at a 2 Hz rate, reaching a minimum look angle of 15 degrees below the horizontal (looking at the ground), and reaching a maximum look angle of 25 degrees above the horizontal (looking at the sky). The laser scanner unit 400 produces 181 range readings per scan (each scan completes in 26 milliseconds), out to a maximum range of 50 meters, from 90 degrees right (starboard side of the vehicle) to 90 degrees left (port side of the vehicle).

In the particular embodiment shown in FIGS. 5A-B, the protective guard 406 includes two support elements 408, 410 connected to a laser scanner base 412. A number of support ribs 414, 416, 418 may be provided between the two support elements 408, 410 and positioned to protect the front nodding laser scanner 400 from becoming damaged and also allow the laser scanner 402 to detect obstacles using the laser beam 403 and not leave obstacles undetected by the laser beam 403. For example, support ribs 416, 418 may be positioned such that the cross-sectional area that is within the laser beam's 403 angular window is limited, so that the support ribs 416, 418 do not prevent the detection of objects. Alternatively, support ribs 416, 418 may be located outside of the angular window of the laser beam 403. In addition, the support elements 408, 410 may be located outside the laser beam's 403 angular window when the laser beam is in a nodding mode. Alternatively, the support elements 408, 410 may be positioned such that a limited cross-sectional area of the support elements 408, 410 is in the angular window of the laser beam 403.

A rear laser scanner may be located on the rear of the vehicle to detect obstacles and may, similar to the front laser scanner, include a protective guard to prevent the rear laser scanner from becoming damaged. The protective guard may include any number of support ribs or support elements that are positioned to prevent the rear laser scanner from becoming damaged and allow the laser scanner to detect obstacles. The rear laser scanner may have the same configuration as the front nodding laser scanner shown in FIGS. 5A-B. The rear laser scanner may also include a laser scanner, such as LMS-291 manufactured by SICK, Minneapolis, Minn.

Figure 6:
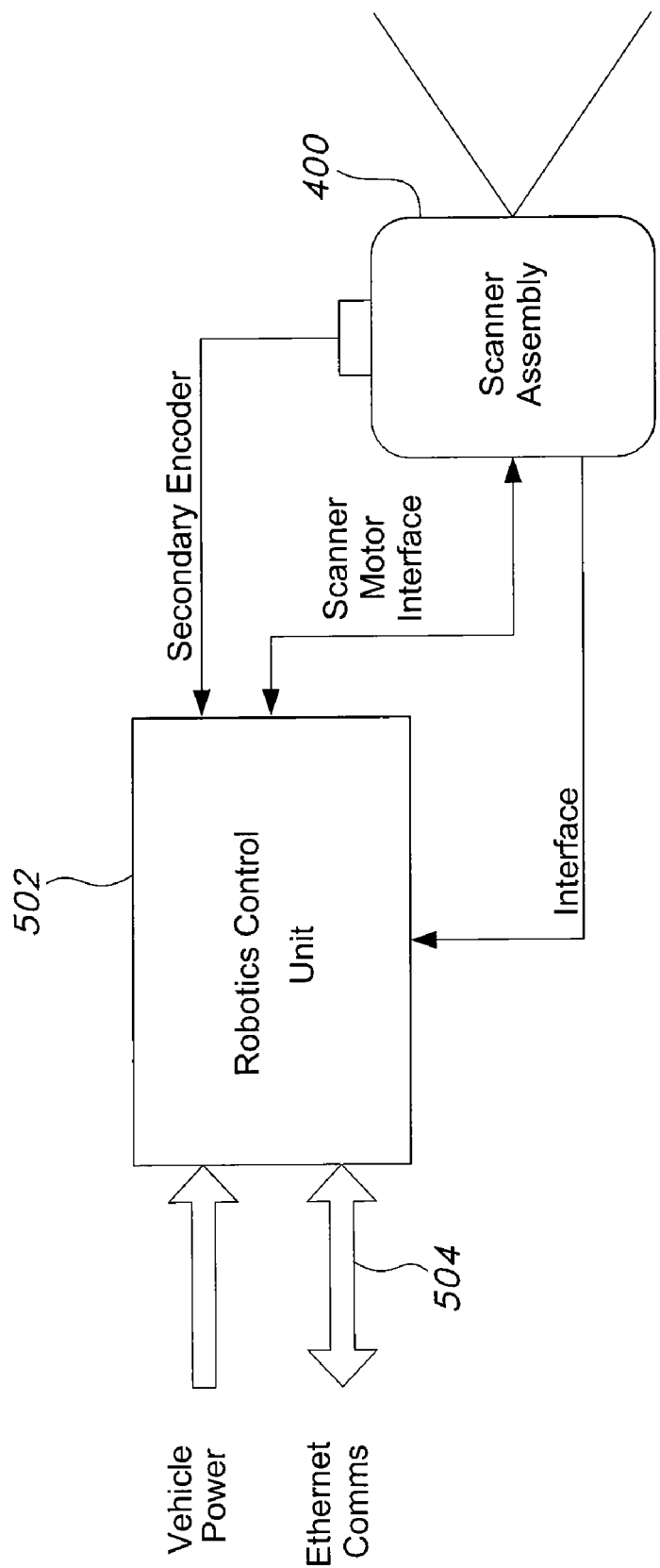
FIG. 6 is a block diagram of the laser scanner communicating with an RCU according to one embodiment of the invention.

As shown in FIG. 6, the nodding laser scanner 400 may be connected to an RCU 502 and transmit three-dimensional data to the RCU 502. The RCU 502 can receive data obtained by the laser scanner 400 and may communicate with other RCUs and a supervisory RCU through, for example, an Ethernet connection 504. The RCU 502 may also control a motor that is connected to the laser scanner 400 to change to the position of the laser beam. In one embodiment of the laser scanner 400, the motor is a Maxon Motor EC40 with GP52C Gear.

The rear fixed laser scanner assembly can gather 2D data about obstacles behind the vehicle and pass that data to onboard computers for processing. The rear laser scanner unit may be mounted in a fixed horizontal position. The laser scanner unit can produce 181 range readings per scan (each scan completes in 26 milliseconds), out to a maximum range of 50 meters, from 90 degrees right to 90 degrees left.

The range guard software can detect interruptions of obstacle data from the laser scanners and publishes substitute data that indicate that obstacles are close in every direction that can be seen ("half moons"). This prevents the vehicle from moving in a direction, which has not been positively determined to be clear of obstacles by the onboard software.

An obstacle map indicates the relative positions of obstacles with regard to the vehicle and is generated by a robotic control unit in the robotic control system through input received from sensors, such as the front and rear laser scanners. The control software determines the correct trajectory through the obstacle field using the obstacle map, and properly commands the control system (steering, throttle, brake, shift) to achieve that trajectory.

After receiving information related to obstacles, desired destination, moving objects, etc., the robotic control unit in the robotically controlled vehicle system may decide vehicle actions based on the information. Actions may include, for example, a change in vehicle velocity, a change in vehicle direction, etc. A drive arbiter system may be provided to decide, based on received and/or known information the preferable actions the vehicle should make. The arbiter uses an algorithm to decide these actions. Specifically, the arbiter receives information, such as destination and obstacle data, from sensors and generates sets of possible actions. For example, action sets or trajectory sets may be provided by any one or all of provider and projector components. Provider components create actions and may include a teleoperation component, "Follow Me" mode information, odometer waypoints, and GPS waypoints. Projector components limit action and may include obstacles detected by sensors or other path information.

Figure 7:
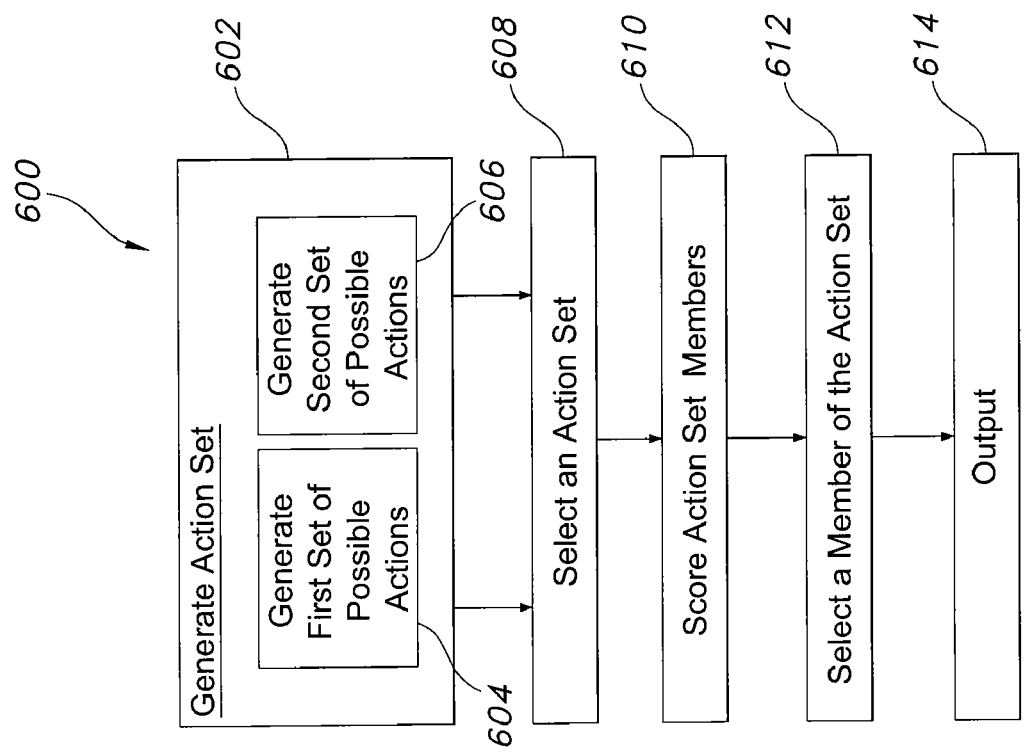
FIG. 7 is a block diagram of a drive arbiter algorithm according to one embodiment of the invention.

FIG. 7 shows a drive arbiter algorithm 600 according to one embodiment of the present invention. As illustrated in FIG. 7, action sets are generated in 602 such as a first set of possible actions 604 from a teleoperation mode and a second set of possible actions 606 from a GPS waypoint mode. The arbiter than selects an action set in 608 based on the priority value attached to the data set. The selected action set is then scored and any projectors may be applied to the action set in 610 by, for example, limiting individual actions within an action set. A member of the action set is selected in 612 and may be based on a preference attached to each trajectory in the set. The arbiter may then output 614 the selected member.

Each action set or trajectory set may contain priority information set by the provider component and an array of trajectories created by the provider component. The action set may also include information set by projector information, such as the presence and location of an obstacle that may limit the action set by the provider component. The trajectories may contain a velocity command, a direction command, and a preference value between 0 and 1, the value of which depends on the velocity command and information known and obtained from the sensors. For example, a trajectory with a preference value of 1.0 may be identified as the preferred action while trajectories with a preference value less than 1.0 may be allowable, but less preferred actions. The drive arbiter selects the action set with the highest priority.

Provider Components

The robotically controlled vehicle may operate under different types of modes. For instance, the vehicle may operate in a "Follow Me" mode, a teleoperation mode, a teaching playback mode, or a GPS waypoint mode.

Follow Me Mode: Under the "Follow Me" mode, one or more objects are identified and the robotically controlled vehicle is controlled to follow the object. Moving object information may be used to generate and manipulate vehicle movement behavior. In some embodiments of the present invention, moving object information may be used to discard or expire data points associated with moving objects if they are in the "tail" or associated with an object's previous position to allow the vehicle to move closer to a moving object without dodging the data points associated with the object's previous position.

Figure 8:
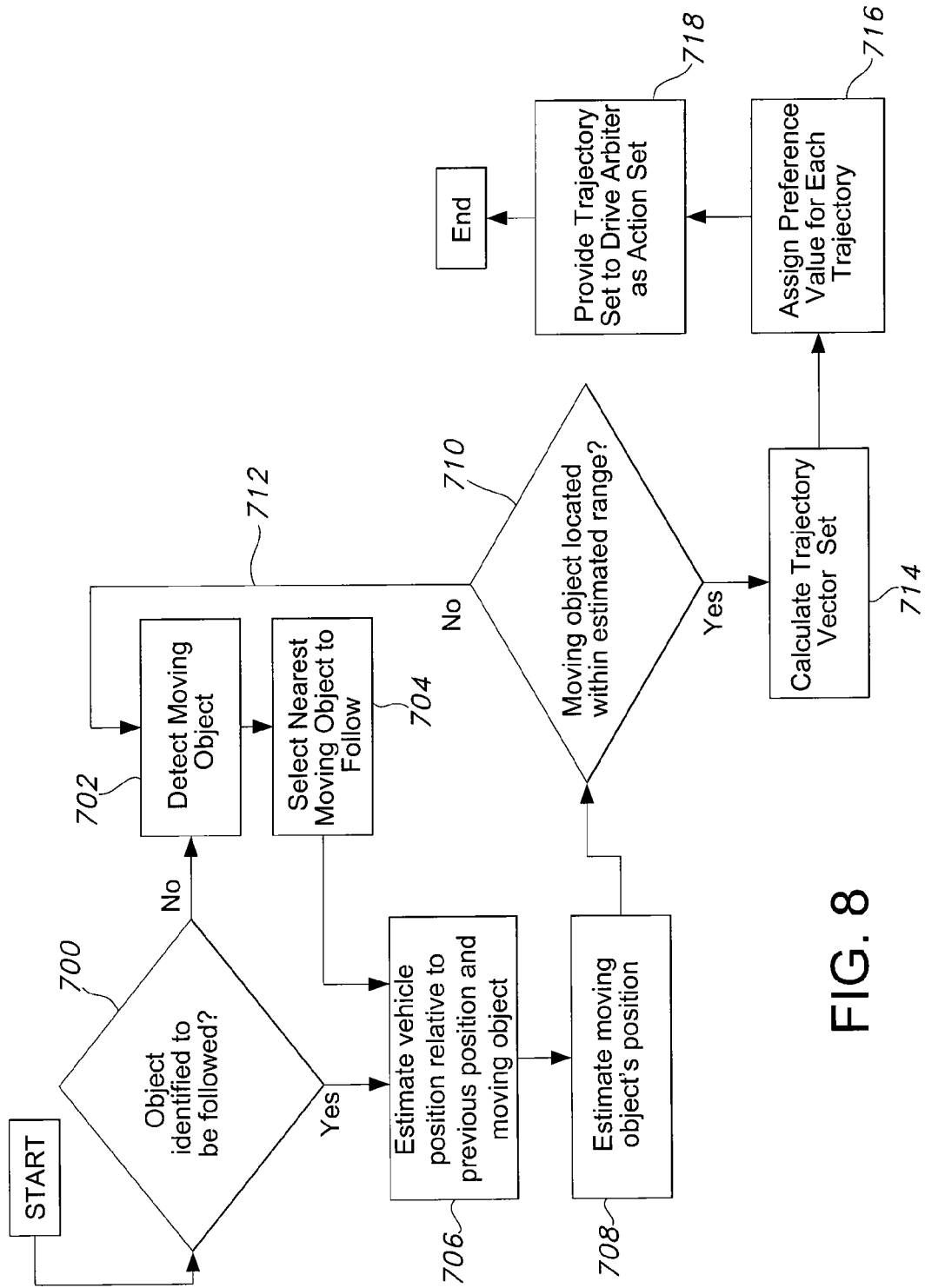
FIG. 8 is a block diagram of a moving object detection system according to one embodiment of the invention.

As illustrated in FIG. 8, a system determines whether an object is identified as one to follow (700). If there is no set object, the system may detect (702) and select (704) the closest object within the detection zone, which may be defined by the area with which the laser beam has the ability to detect object and/or identify objects. In some embodiments, the system may obtain the current positions of moving objects and the position of the nearest object to a given point, and select the closest object to follow. The "Follow Me" mode algorithm may use a library of commands to create a trajectory towards the object and may include direction and speed components that do not exceed a pre-selected maximum allowed speed and include a direction to stop at a pre-selected distance away from the object.

After the object is initially selected or the vehicle is already following the object, the vehicle's position may be estimated relative to its previous position and the object's movement (706). Additionally, the object's estimated or expected position is also calculated (708). If no moving object is detected within the estimated position range within a pre-determined amount of time, the vehicle will no longer search for the moving object and will attempt to locate another moving object to follow using the process described above (712).

After detecting the moving object, a trajectory set is calculated to provide the vehicle with movement commands (714). The trajectory may be spread into a trajectory set by calculating vectors separated by a pre-determined angle, for example by 5 degrees, to the right and left of the moving object trajectory. Additional trajectories may be included between the vectors to provide additional trajectories of a trajectory set. Each trajectory may be assigned a preference (716). For example, the trajectory located in the middle of the trajectory set may be assigned a value associated with the most preferred while the vectors furthest from the middle vector have a preference value associated with the least preferred vector. The trajectory set is then provided to the drive arbiter component as an action set (718). An obstacle map may be calculated, based on information obtained from sensors, such as the front and rear laser beams, including the presence and location of obstacles. The obstacle map may be provided to the drive arbiter component as a limit on the trajectory sets. Under the "Follow Me" mode, obstacle avoidance information, detection, or responsive behaviors as described herein may be interpreted by the robotic control system to alter the trajectories in the trajectory set or change preferences among trajectories to: (1) avoid obstacles; (2) prefer trajectories farther from the middle trajectory if the middle trajectory is interpreted to include obstacles, such as negative obstacles, including holes or elevation drops, or positive obstacles, such as a structure or tree, or exclude candidate objects to follow; (3) change or lower the maximum allowed speed; (4) change or increase the pre-selected stopping distance; and (5) otherwise alter instructions carried out in "Follow Me" mode to account for obstacles.

GPS Waypoint Mode: In some embodiments of the present invention, the vehicle is directed based on GPS waypoint information using a GPS determination system. Examples of a GPS determination system include Navcom SF-2050M, available from Navcom Technologies of Torrance, Calif. For instance, GPS waypoint information is continually updated from a waypoint list and trajectory sets are developed based on the next waypoint relative to the current and/or last waypoint. First, a current waypoint correlating to the position a vehicle is supposed to be located is calculated. A heading controller library provides a trajectory towards the current position with velocity and direction information that will prevent the vehicle from exceeding a pre-determined speed to reach the current position. The vehicle's position is then calculated to determine whether the vehicle is within the waypoint radius or whether the vehicle has traveled passed a perpendicular plane associated with the particular waypoint.

A "next" waypoint is then determined and a trajectory is calculated based on the current and next waypoint. Based on the trajectory information, a trajectory set is created by calculating vectors with a predetermined distance between them, for example 5 degrees, with the moving object trajectory being assigned the trajectory in the middle of the set. Additional trajectories may be included between the created trajectories and each trajectory assigned a preference value, with less preferred values being assigned to trajectories further from the middle trajectory.

Furthermore, a user may record a pre-determined GPS path and provide the information to an RCU by saving the information to an RCU's flash memory. The user may then initiate a GPS path playback system by utilizing a dashboard control unit. The user may record the GPS information by initially recording GPS latitude and longitude readings where the GPS information is compressed by removing outlying GPS information. The waypoint list manager may queue waypoints that are selected to be followed. In some embodiments of the present invention, path segments between the waypoints may be determined and utilized to create a curved path for the vehicle to follow. Alternatively, a tech center path tracker is utilized to create a path that provides for consistent or smooth vehicle movements. The trajectory set is then provided to the drive arbiter, which will determine the appropriate trajectory based on the trajectory set and information related to the presence and/or location of obstacles. In some alternative embodiments, trajectory sets are created based on data obtained from a compass, instead of a GPS system, and relative locations of objects, destination points, and/or previous position data. Examples of compass systems utilized include electronic compass TCM 2-20.

Under the "GPS Waypoint" mode, obstacle avoidance information, detection, or responsive behaviors as described herein may be interpreted by the robotic control system to: (1)

alter the trajectories in the set, or paths or path segments, or change preferences among trajectories in the set or waypoints in the list to avoid obstacles; (2) prefer trajectories farther from the middle trajectory if the middle trajectory is interpreted to include obstacles, such as negative obstacles, including holes or elevation drops, or positive obstacles, such as a structure or tree, or exclude candidate objects to follow; (3) change or lower the maximum allowed speed; (4) change or increase the pre-selected stopping distance; and (5) otherwise alter instructions carried out in "GPS Waypoint" mode to account for obstacles.

Teleoperation Mode: In some embodiments of the present invention, the vehicle's path is developed by teleoperation. A receiver, connected to the vehicle is adapted to receive commands. For example, the teleoperation component may open a socket, such as by creating a communications end-point and returning a file description with which to access a socket that is associated with a socket address, including a port number a local host's network address. Commands are transmitted from a user control interface based on information transmitted to the user control interface that is, or is associated with, data captured by a camera located on the vehicle through a radio communications link or network. Examples of such radio networks include the utilization of 2.4 GHz Netgate radio system or a Novaroam EH900 900 MHz radio system. The Novaroam EH900 900 MHz system may be combined with a Netgate 802.22b system to provide superior communication over relatively short and long distances. Examples of camera systems include a 10/100 Base T Fast Internet connection and a Sony SNC-CS3N camera.

The teleoperation system may receive a command that includes either zero or non-zero velocity information. If the velocity command is zero, a command history is consulted to determine whether a pre-determined number of past commands have also contained a zero velocity command. If the current trajectory set is based on any directional information associated with the current command, a trajectory set is not created. If the velocity command is non-zero or one or more of the previous commands have included non-zero velocity commands, a trajectory set is created. A trajectory set is created by calculating vectors with a predetermined distance between them, for example 5 degrees, with the moving object trajectory being assigned the trajectory in the middle of the set. Additional trajectories may be included between the created trajectories and each trajectory assigned a preference value, with less preferred values being assigned to trajectories further from the middle trajectory. The trajectory set is then provided to the drive arbiter, which will determine the appropriate trajectory based on the trajectory set and information related to the presence and/or location of obstacles. Under the "Teleoperation" mode, obstacle avoidance information, detection or responsive behaviors as described herein may be interpreted by the robotic control system to: (1) alter the trajectories in the set or change preferences among trajectories in the set to avoid obstacles; (2) prefer trajectories farther from the middle trajectory if the middle trajectory is interpreted to include obstacles, such as negative obstacles, including holes or elevation drops, or positive obstacles, such as a structure or tree, or exclude candidate objects to follow; (3) change or lower the maximum allowed speed; (4) change or increase the pre-selected stopping distance; and (5) otherwise alter instructions carried out in "Teleoperation" mode to account for obstacles.

Teach and Playback Mode: In some embodiments of the present invention, the vehicle may be operated in a teach and playback mode. A user interface may be provided such as a dashboard control unit attached to the vehicle or incorporated in a teleoperation system (or some other suitable user interface). The teach and playback system may provide the vehicle with an instruction to record movements, drive signals and other path related information, such as GPS waypoints, location of obstacles, etc., and follow the recorded information when following a path back to the origination. For instance, the vehicle will store velocity and direction information and correlate the information to particular GPS data and/or time stamp information. Upon a return trip, the system recalls the data to provide the vehicle with velocity, directional, or any other related information to follow a return path. The vehicle may be capable of following the playback movement information and data in either the forward or reverse. In addition, the data recording may be repeated for additional path trips. Under the "Teach and Playback" mode, obstacle avoidance information, detection, or responsive behaviors as described herein may be interpreted by the robotic control system to: (1) alter the trajectories in the set, or paths or path segments, or change preferences among trajectories in the set or waypoints in the list to avoid obstacles; (2) prefer trajectories farther from the middle trajectory if the middle trajectory is interpreted to include obstacles, such as negative obstacles, including holes or elevation drops, or positive obstacles, such as a structure or tree, or exclude candidate objects to follow; (3) change or lower the maximum allowed speed; (4) change or increase the pre-selected stopping distance; and (5) otherwise alter instructions carried out in "Teach and Playback" mode to account for obstacles.

Obstacle Avoidance

Figure 9:
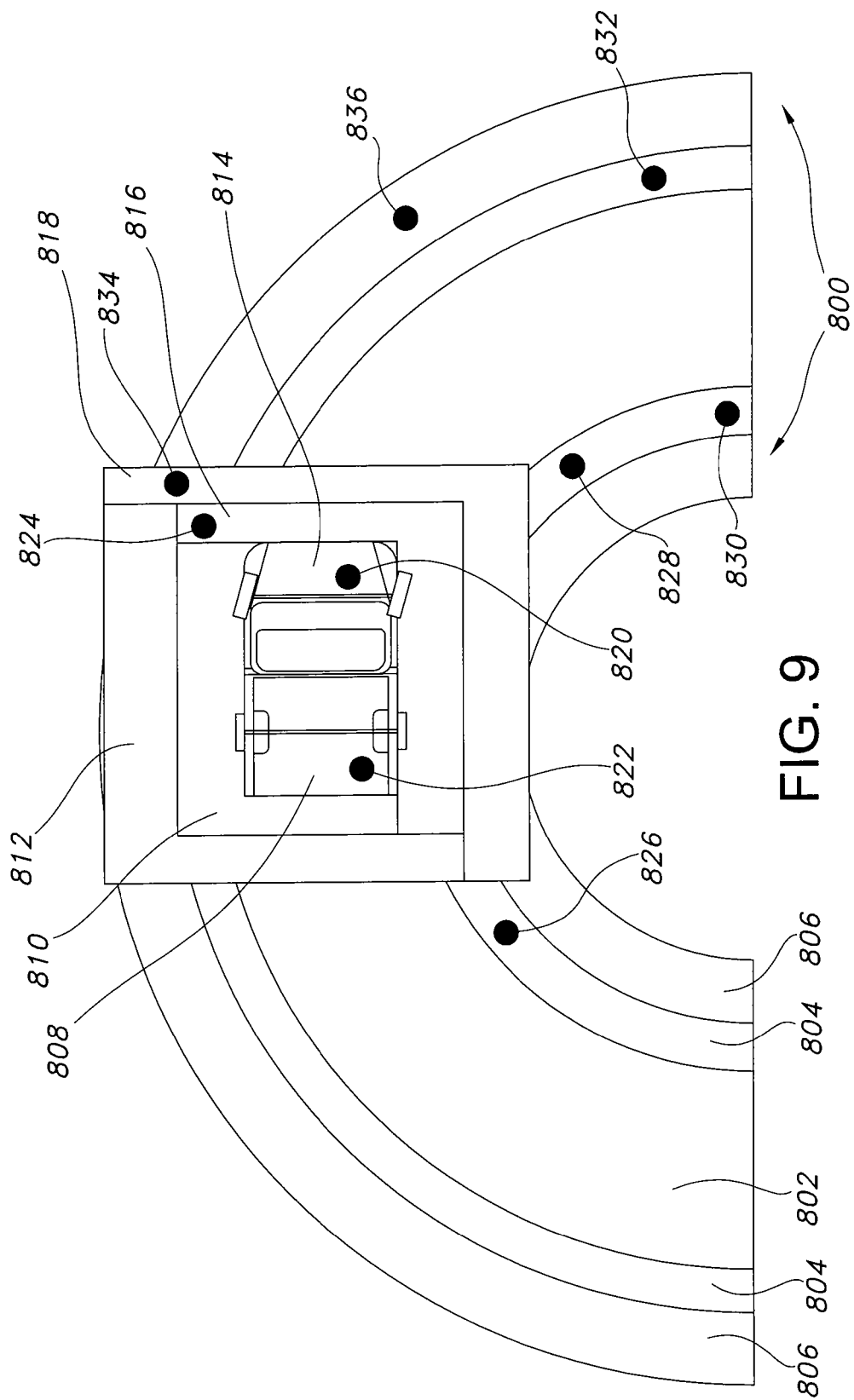
FIG. 9 shows paths and zones related to a robotically controlled vehicle's movements according to one embodiment of the invention.

As stated above, obstacle information is detected by sensors including, for example, laser beams, manipulated into usable information, and provided to the drive arbiter system as "projector" behaviors in order to modify the trajectory sets to, ultimately, control the vehicle to avoid the detected obstacles. For instance, the obstacle avoidance system modifies the trajectories and/or preference scores in a manner that may be consistent with a pre-determined set of criteria. These criteria may relate to vehicle zones, shown in FIG. 9, that relate to areas around the vehicle 800 and/or the location of detected obstacles. As illustrated in FIG. 9, these zones may include a body path 802, danger path 804, caution path 806 and, depending on the trajectory, a trailing body zone 808, trailing danger zone 810, tailing caution zone 812, and leading body 814, danger 816, and caution trail 818. The criteria may include a stop command being sent to the supervisory RCU if obstacles are detected in the leading body 814, such as obstacle 820, or danger 816 zones, such as obstacle 824. In addition, if obstacles, such as obstacle 822, are detected in the tailing body zone 808 or the trailing danger zone 804, such as obstacle 826, a command to limit the vehicles velocity to a predetermined level is sent to the RCU and the available trajectories are limited to a predetermined number, for example to a danger trajectory preference set. Additional criteria may provide for the system to determine the nearest obstacle in the danger path 804, such as obstacle 828 relative to obstacles 830, 832, and to limit the velocity to a certain value, for example to less than 25% of the maximum deceleration velocity, manipulate the trajectory sets to a danger path preference set by eliminating a pre-determined number of trajectories, and reduce the trajectory preference levels associated with the danger path 804 or near the danger path 804. Furthermore, if obstacles are located in the leading caution zone 818, such as obstacle 834, a command is provided to limit the velocity to a pre-determined caution velocity value. Finally, if objects are detected in the caution path 806, such as obstacle 836, a command is provided to limit the velocity to the greater of a value between the pre-determined maximum caution velocity and the minimum caution velocity or 10% above the maximum safe velocity and a value associated with the maximum safe velocity, the caution velocity may be scaled by the ratio of the caution path clearance to the caution zone width, and the preference between the caution maximum preference and the caution minimum preference by the ratio of clearance range to the caution zone width. Based on the obstacle information and the trajectory, for example as discussed above, the trajectory set is manipulated by the drive arbiter to command the vehicle to proceed in a manner in order to avoid the obstacles.

Obstacle Map Generation

Figure 10:
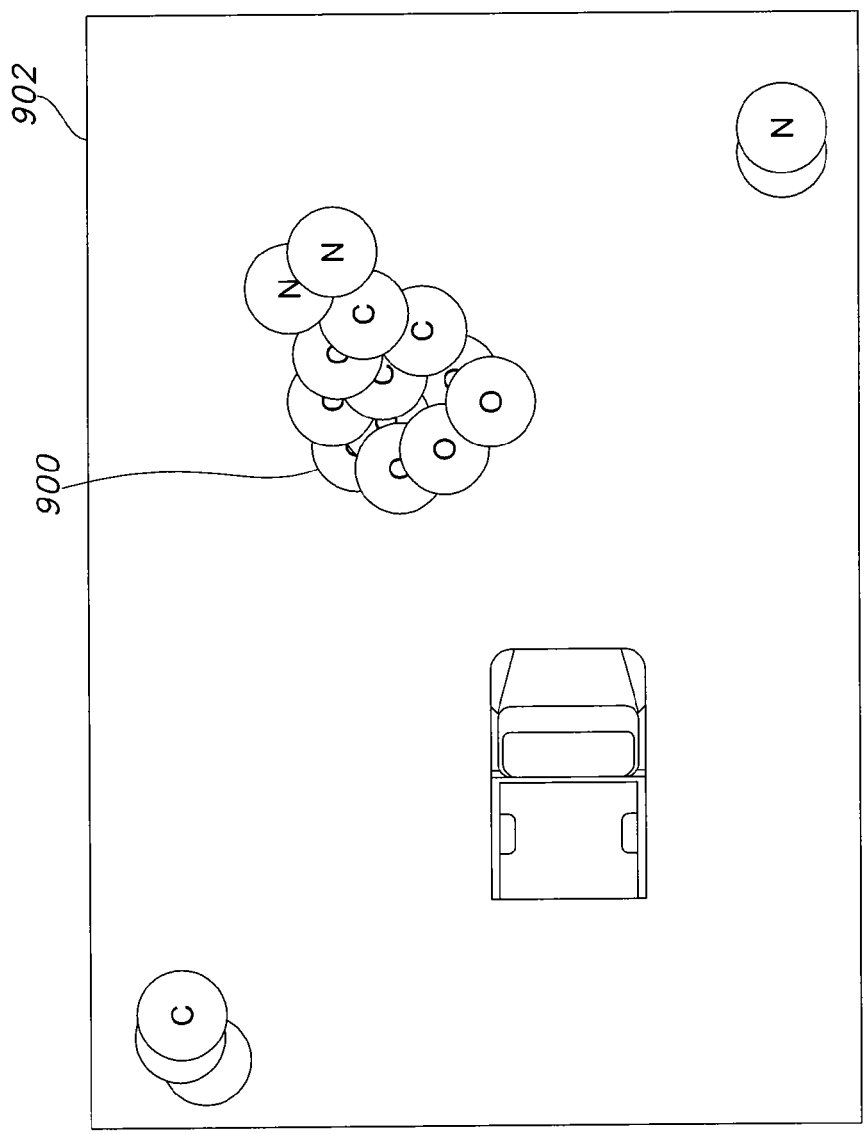
FIG. 10 illustrates clusters of adjacent points that are related to the moving object detection system according to one embodiment of the invention.
Figure 11B:
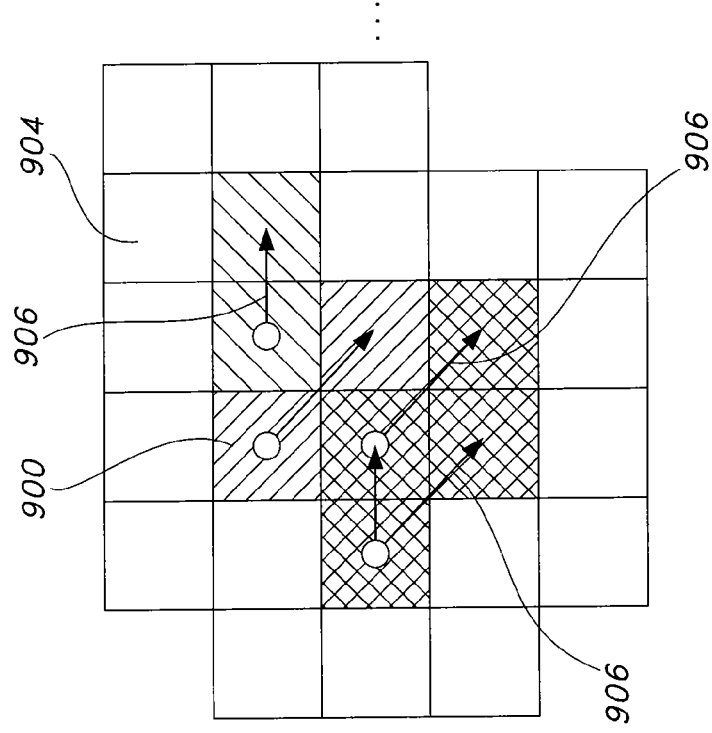
FIGS. 11A-B illustrate grid cells associated with clusters of points related to the moving object detection system according to one embodiment of the invention.
Figure 11A:
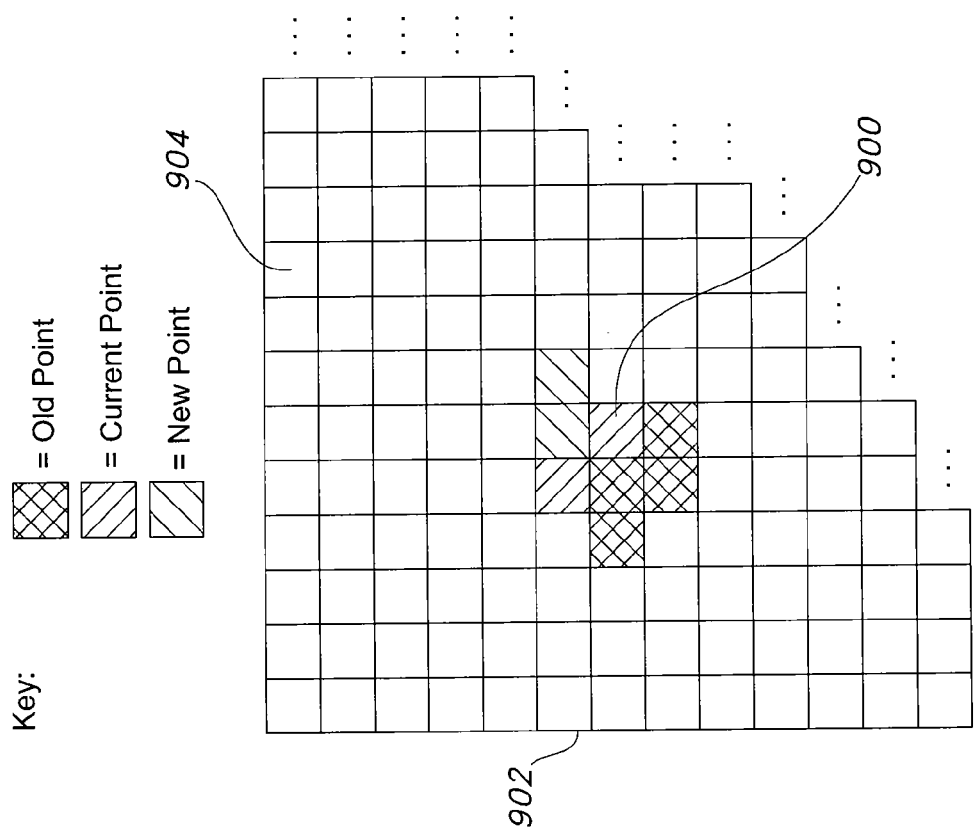

The systems described above rely on the detection of obstacles, moving objects, and the development of an obstacle map. The detection of obstacles may include detecting groups of obstacles in the obstacle map that are new, groups of obstacles that are current within a time-out interval, and groups of obstacles that have recently expired. An obstacle map is developed from data points and information obtained by the laser scanner and provides an interface for analyzing possible actions by the vehicle. The data points may be time stamped to provide the detection system with the ability to classify data points into new, current, and old data points. The obstacle map may also include information such as time intervals since previous laser beam scans to detect the presence of moving objects. As shown in FIG. 10, moving objects are detected by the presence of adjacent points 900 obtained by the laser scanner. Each point is time stamped and mapped to a grid cell. The time stamped points 900 may be divided into old points 904, current points 906, and new points 908. As shown in FIGS. 11A-B the detected points 900 may be superimposed on a grid 904 correlating to the scan window 902. The cells are partitioned into subsets of adjacent grid cells 906. Each group of adjacent occupied grid cells 906 represents a candidate object. If the candidate object includes different new and old points, the candidate object has likely moved. An object is likely stationary if the new and old points are the same. For each group of adjacent points, the center of the newly detected adjacent group and the older detected adjacent group is calculated. Using the difference between the two center points, along with the scanning rate, the moving object's velocity, heading, and radius may be calculated. The output of the detection can contain contents of a moving object data such as an identification, center of old points, center of new points, a heading, velocity, radius, and a list of old points. The moving object behavior is utilized to control the vehicle in the "Follow Me" mode and to allow the data points in the grid to expire by detecting whether the points are associated in the moving object "tail" (i.e. the moving object's previous position or set of positions) and allowing the vehicle to follow closer to the moving object.

The obstacle map included with an embodiment of the present invention produces an obstacle report that indicates the obstacle map's best estimate of the obstacle characteristics. For consistent obstacle reports and quick determination of the nearest obstacles within particular paths around the vehicle, as illustrated in FIG. 9, the density of obstacles may be obtained in any particular zone around the vehicle. Therefore, the obstacle report may include obstacle densities and the range of closest obstacles with respect to each path associated with the vehicle. The obstacle avoidance system will use the obstacle report to score individual trajectories submitted to the drive arbiter.

Figure 12:
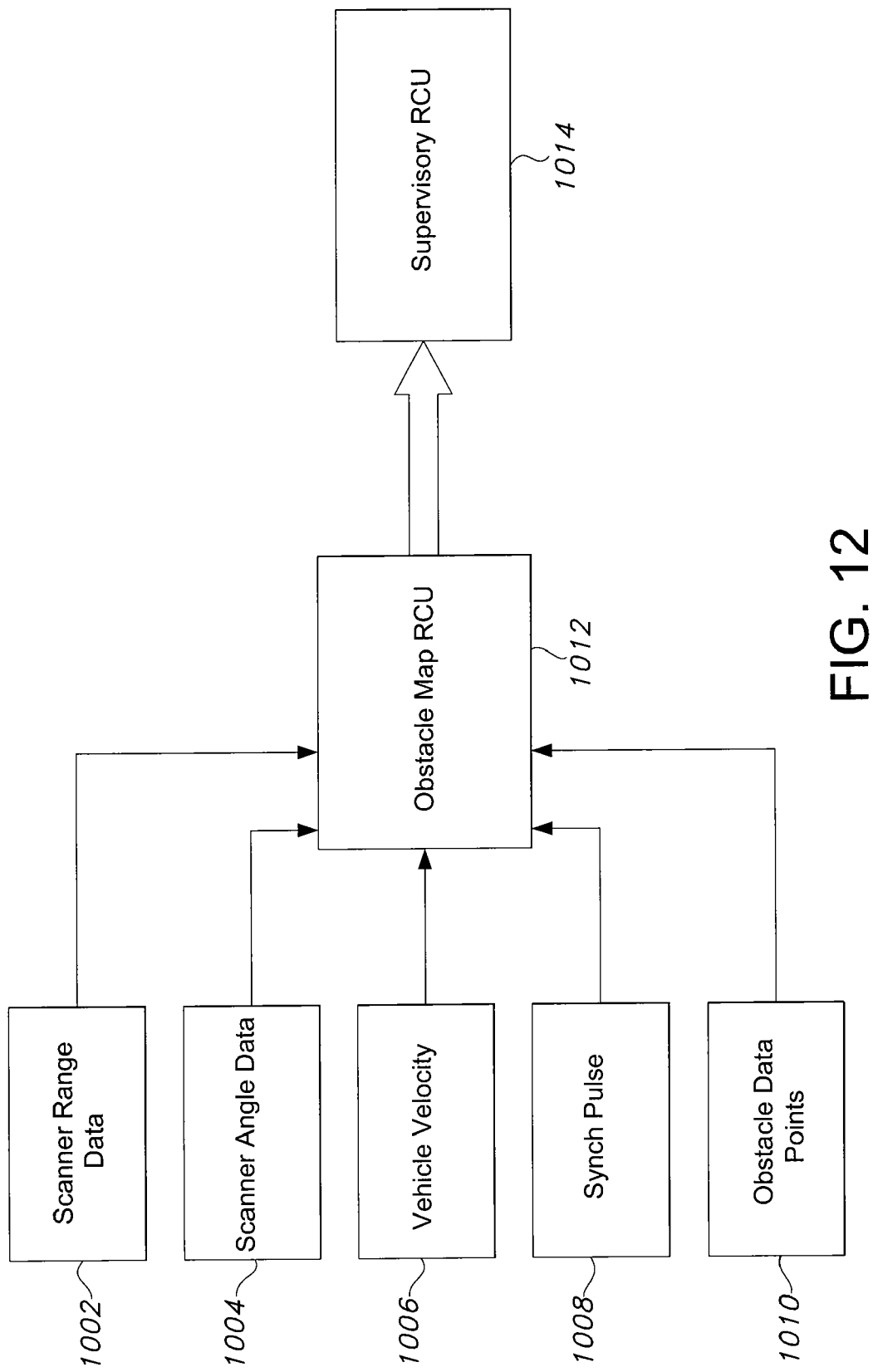
FIG. 12 is a flow diagram of a 2D to 3D conversion system for detecting obstacles according to one embodiment of the invention.

In some embodiments of the present invention, a 2D sensor, such as front and rear laser scanner mechanism, may be used as a 3D sensor. Briefly, system components integrate range data, angle data and vehicle velocity data in order to create an obstacle map by using four dimensions of data. The resulting map may be an accurate representation of an obstacle at a relatively high speed. As illustrated in FIG. 12, an obstacle map is obtained by sending laser scanner range data 1002, scanner angle data 1004, vehicle velocity data 1006, a synch pulse 1008, and obstacle data points 1010 obtained by a first scan of the laser to an obstacle map RCU 1012. The RCU 1012 time stamps the data and provides the angle of the laser when the laser performed the scan, or the angle of nodding. The time stamped data points, synch pulse data, and angle of nodding is sent to the supervisory RCU 1014 to provide the supervisory RCU with four dimensions of data for obstacles to create the obstacle map.

Some embodiments of using a 2D scanner to provide 3D data include a laser scanner RCU that receives configuration data manually from a user, through a telecommunications networks or from another component in the vehicle control system. Based on the configuration information, the scanner RCU configures the driver to output range data 1002 and to read the range data 1002 and time stamp it. A nodding motion controller reads configuration data, receives commands to control the laser nodding and scanning behavior, and manipulates the scanning parameters in accordance with the commands. In addition, the nodding motion controller may receive a horizontal sync pulse from the driver as an interrupt and notes the time of the last interrupt. One or more elevation messages may be received from a nodding motion controller board and the nodding motion controller computes the start time of the last scan based on an empirically determined fixed offset from the horizontal sync pulse. The controller then uses the time to timestamp the elevation data. Time stamped elevation data is then sent to a 3D map generator. The 3D map generator may read configuration data, scans from the driver, and time stamped elevation messages. The 3D map generator then computes the elevation of the nodding mechanism at the start of the last range scan based on the sinusoidal motion of the nodder. Each scan is then marked with the computed elevation at the start of the scan. The 3D map generator then publishes range data that is annotated with elevation information to a message queue for use by a supervisory RCU. Furthermore, the 3D map generator detects a loss of synchronization, due to, for example, errors in the input/output, and resynchronizes by discarding data until a match can be achieved between the timestamps.

Figures 13A, 13B:
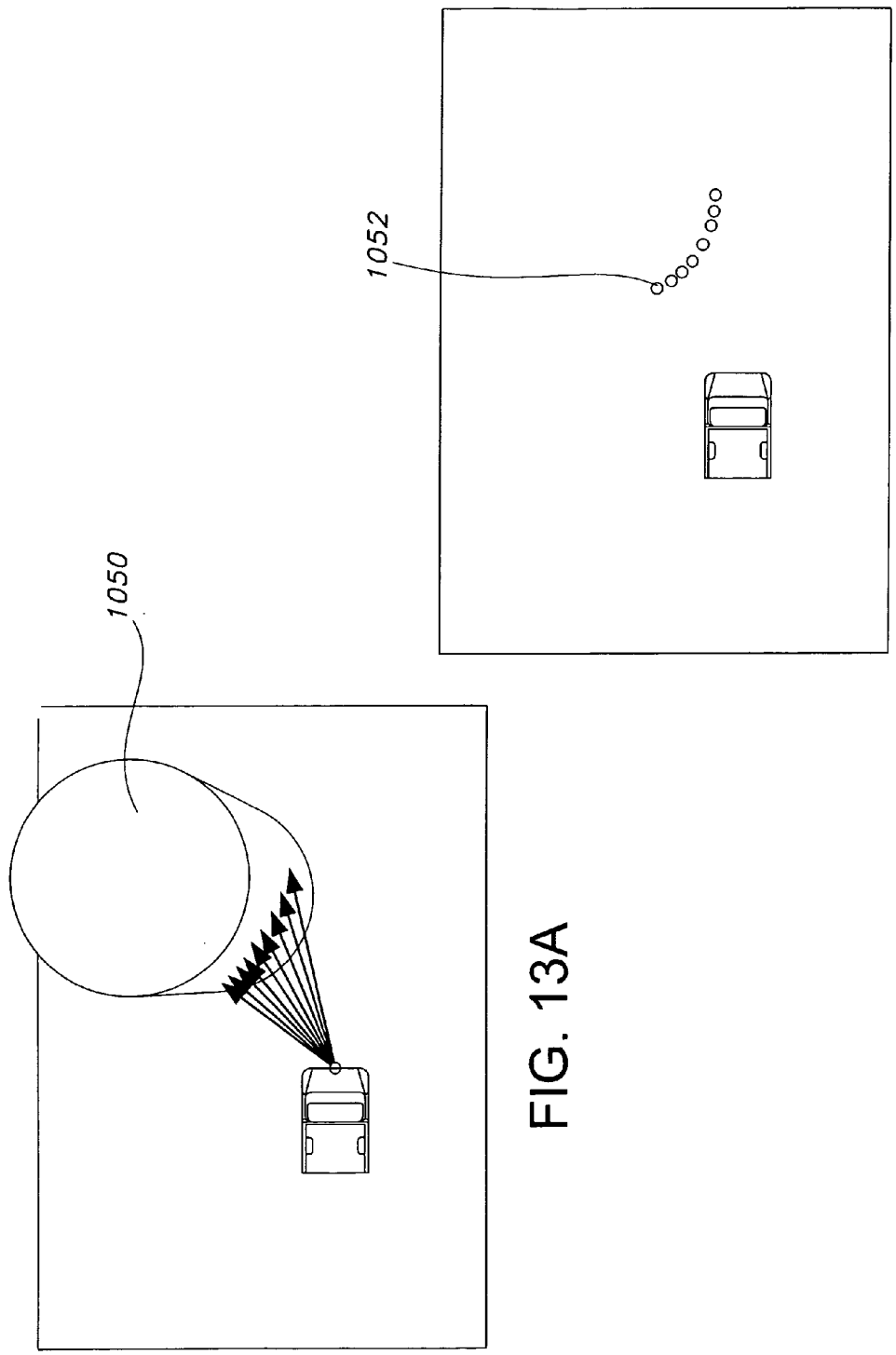
FIGS. 13A-B illustrate 3D to 2D data points associated with the 3D to 2D data conversion system according to one embodiment of the invention.
Figure 14:
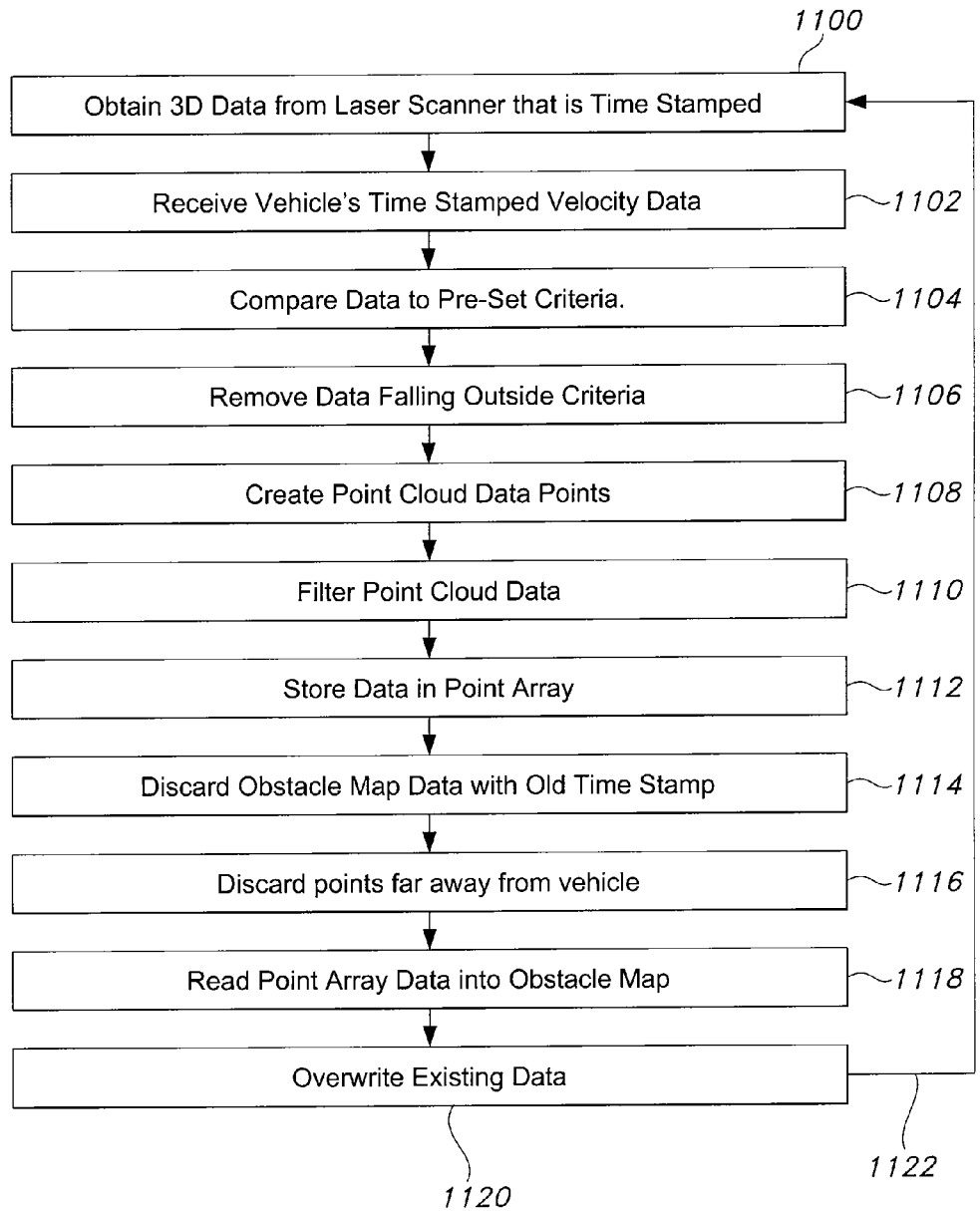
FIG. 14 is a flow diagram of a 3D to 2D conversion system for detecting obstacles.
Figure 15:
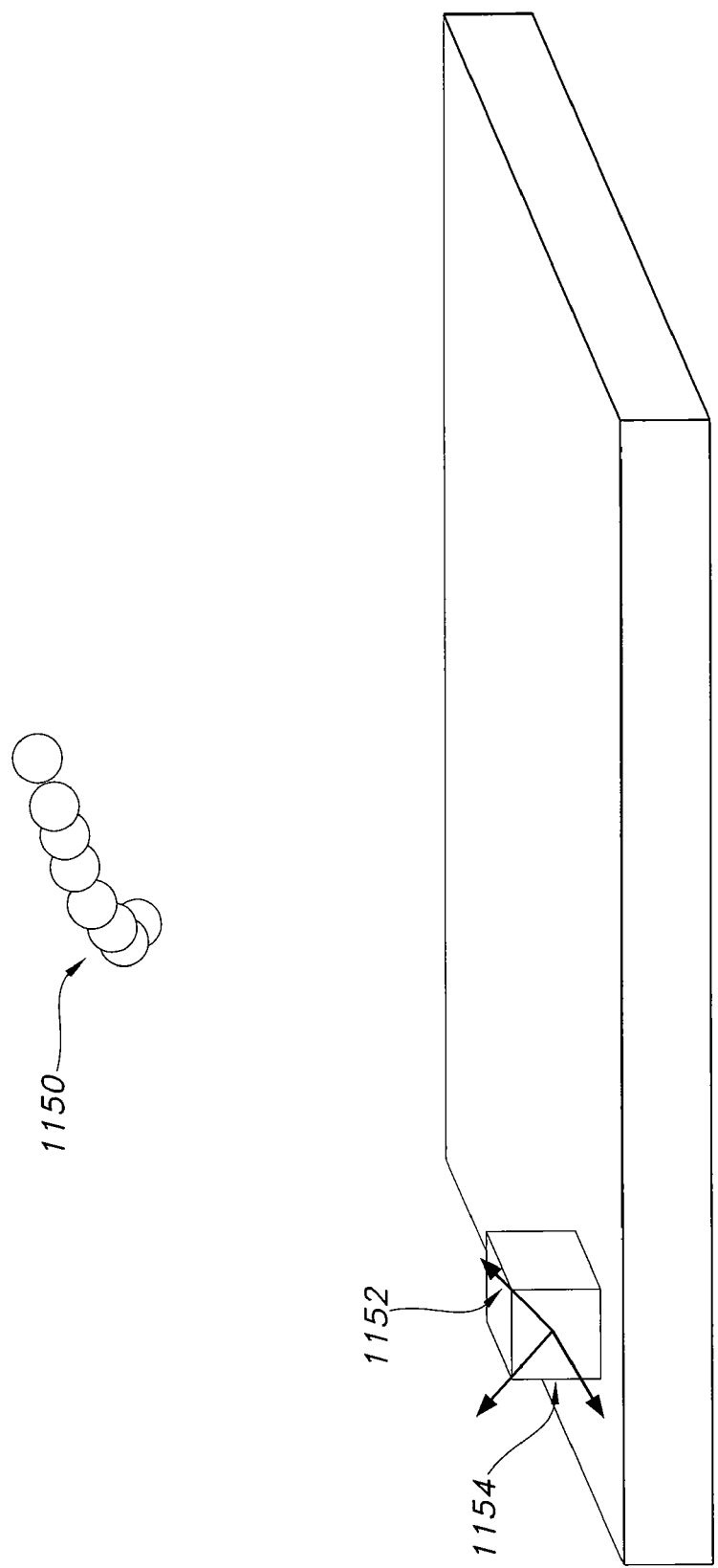
FIG. 15 illustrates a sensor detection system according to one embodiment of the invention.
Figure 16:
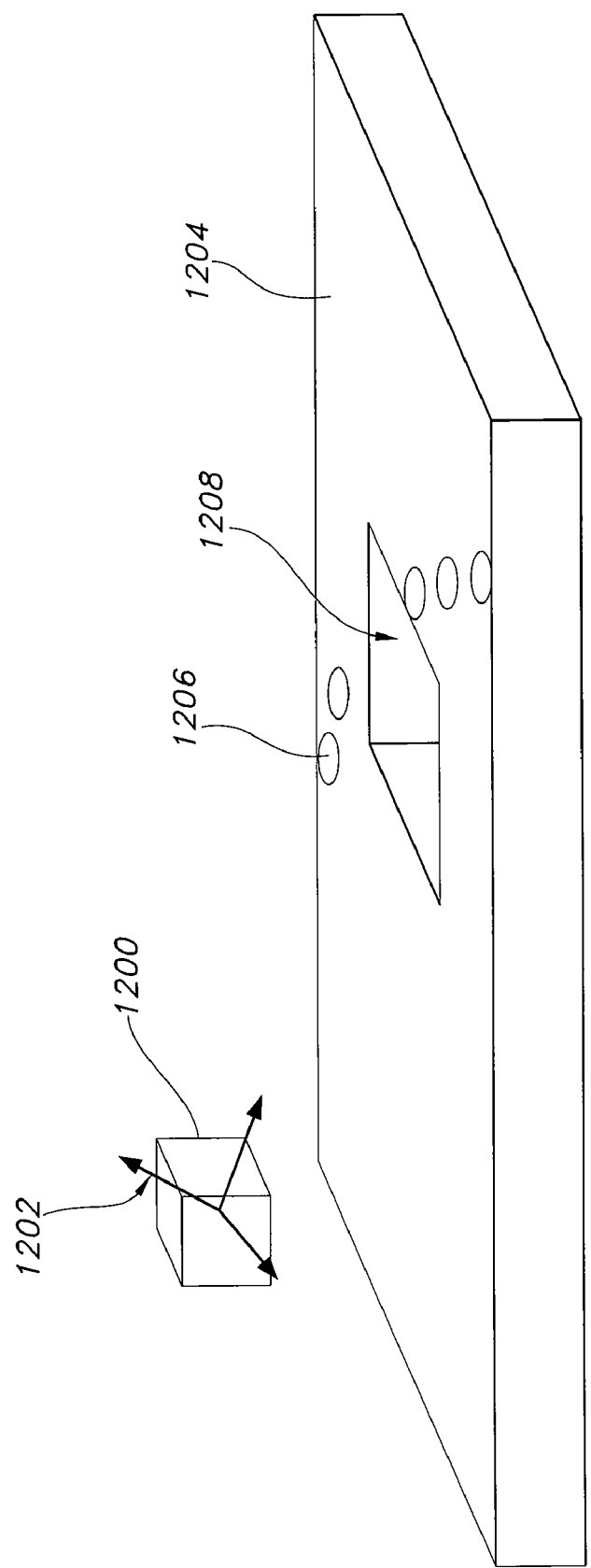
FIG. 16 shows a laser scan sensing holes or negative obstacles according to one embodiment of the invention.
Figure 17:
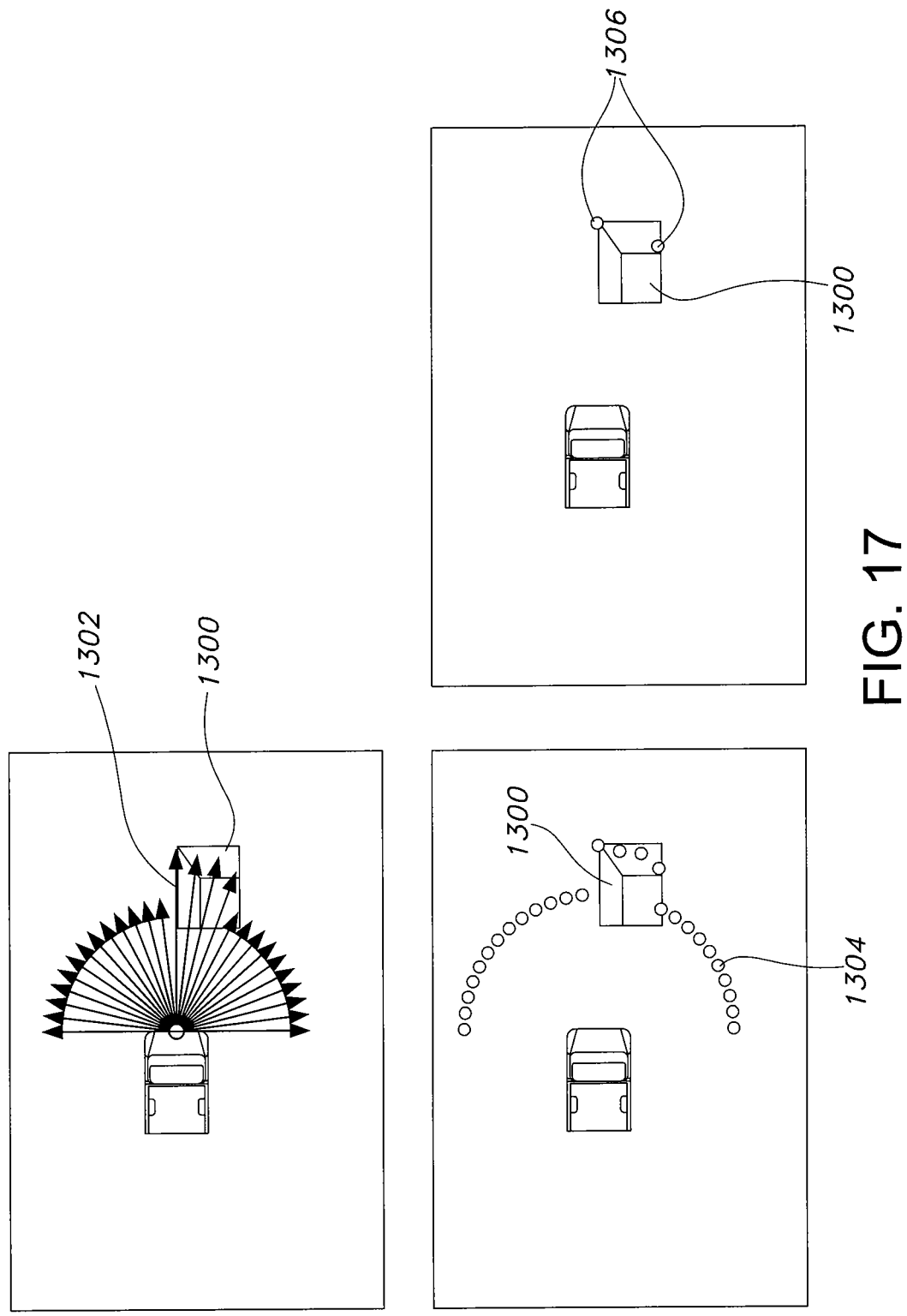
FIG. 17 shows a laser scan obtaining data on a possible obstacle due to a discontinuity in data according to one embodiment of the invention.
Figure 18:
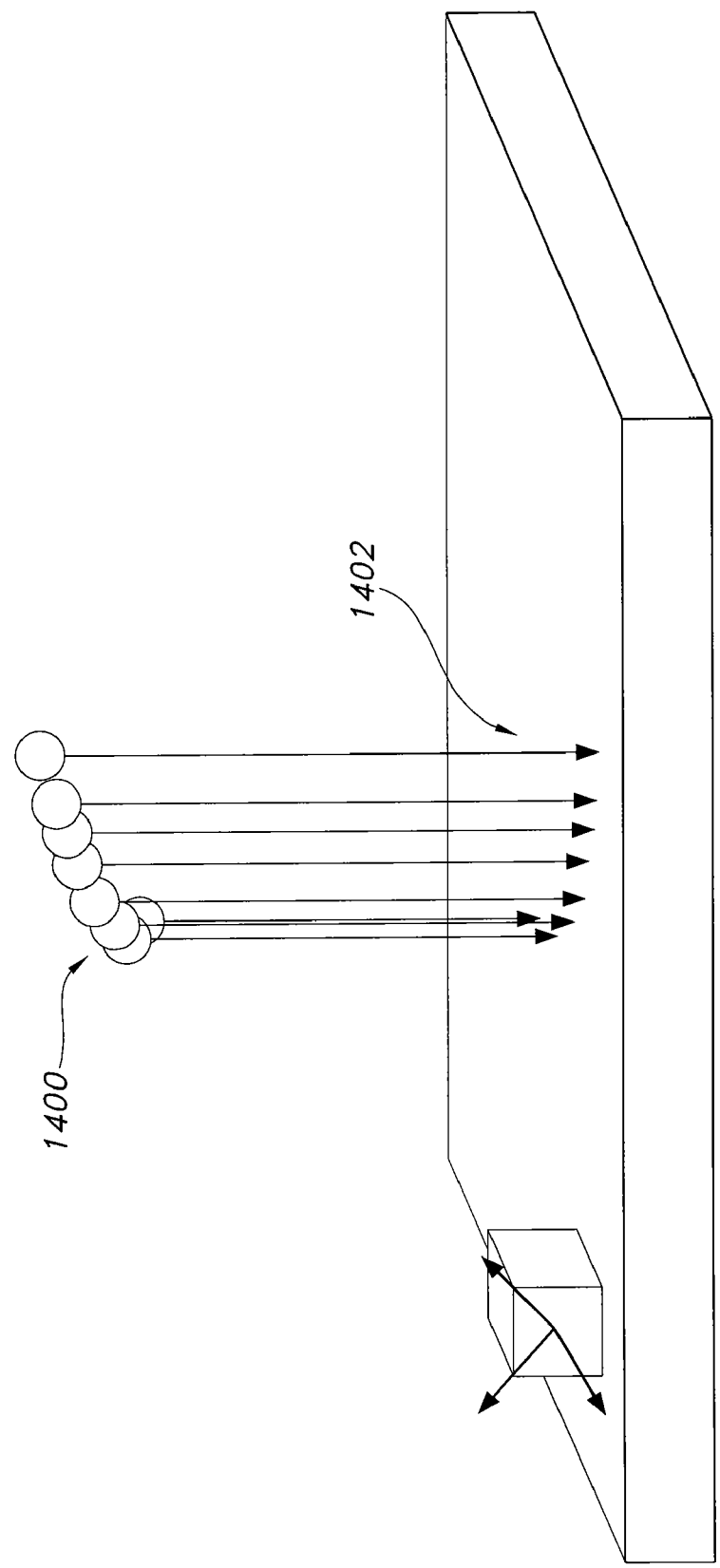
FIG. 18 shows a laser scan obtaining points that are mapped to a 2D scan range according to one embodiment of the invention.

The obstacle avoidance system included in some embodiments of the invention may include converting 3D obstacle information to 2D data to assist in directing the vehicle to avoid obstacles. As illustrated in FIG. 13a, sensor data, such as data obtained by the front nodding laser and rear laser, includes a relatively large number of 3D data points that represents a 3D object 1050. As illustrated in FIG. 13b, however, only a relatively small number of 2D points 1052 are needed in some systems to adequately map the presence of obstacles. Embodiments of the invention generate an obstacle map that converts the 3D sensor data into a set of 2D points that represent obstacles or other objects. As illustrated in FIG. 14, the 3D data to 2D data conversion includes obtaining sensor points that may be time stamped and include a 3D point set and the orientation of the sensor with respect to the vehicle (1100). The vehicle's time stamped velocity, correlating to the time stamped points, is utilized to create a 2D map (1102). For example, and as illustrated in FIG. 15, once the orientation 1152 of a sensor, such as laser scanner 1154 is known, obstacle points 1150 are mapped relative to the orientation 1152 of the sensor and correlating to time-stamp of each. Next, the data is compared to pre-set criteria (1104) and data points identified as superfluous because they are, for example, "too far," "too high," or "too low" relative to the vehicle are identified as falling outside the criteria (1106). Data points that are "too low," however, do not include data points that may indicate holes, cliffs, or other depths that may be considered obstacles. For example, if a discontinuity of data points is detected in a scan, as illustrated in FIGS. 16 and 17 and discussed in more detail below, the data point scan indicates the presence of a hole or other similar obstacle. After discarding the irrelevant data points, the data points that remain correlate to a 2D point cloud for a single set of data points (1108). As illustrated in FIG. 18, points of range data 1400 that remain after filtering for "too far away," "too high" and "too low, but not a hole" are mapped into 2D 1402.

The resulting 2D point cloud includes data points with position information in the form of (x, y) and is associated with time-stamp information. The point cloud data points are further filtered to remove unnecessary data points (1110). For example, only points within 25 meters of the vehicle's origin and at a resolution of 10 centimeters may be included. Therefore, the point grid may represent an index of a point array (1112). The point array holds the data on individual points obtained during a specific laser scan. Each time the points are added to the grid, any data points are first removed from the grid. Similar to the grid, the point array data points are discarded upon certain conditions. For instance, if the timestamp associated with the data is determined to be "too old" to be relevant, the point array data point is discarded (1114). In addition, if the distance from the particular point to the origin of the vehicle becomes outside a pre-set range, the point array data point is discarded (1116). Ultimately, most, if not all, of the data points will be discarded based on these criteria. Next, the current point array containing points selected from previous sensor data is processed onto the grid (1118). If a grid index already has a point stored in it, the data point will be discarded and the new data point will be stored in that particular index (1120). If the vehicle is still active, another laser scan data set may be obtained and the process begins again (1122).

As stated above, FIGS. 16-17 show a discontinuity present during a laser scan. In FIG. 16, a laser scanner 1200 having a laser scanner orientation 1202 is scanning a scan range area 1204 using, for example, a laser beam. The laser scanner 1200 may orient a laser beam across the scan range area 1204 in, for example, a half-moon or semi-circular shape. For example, the laser beam spots 1206, which represent areas where the laser beam has detect are oriented, generally, in a semi-circular shape. The laser scanner 1200 may detect a discontinuity 1208 of laser beam data points during a scan. The discontinuity 1208 may be formed by a decrease in scan range area 1204 elevation or as a hole in the scan range area 1204.

FIG. 17 illustrates discontinuities 1300 detected using a variety of laser beam data points. The data points may be obtained by vector beams 1302, a half-moon or semi-circular shaped laser beam scan 1304, or by detecting two data points 1306 having a different pattern or expected characteristics as other data points. The discontinuity 1300 may then be used to limit or otherwise direct vehicle action.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the this invention.

What is claimed is:

1. A robotically controlled vehicle comprising:
   a robotic control unit comprising a control application;
   a sensor for detecting object data representing detected obstacles or objects located outside of the robotically controlled vehicle and for transmitting the object data to the robotic control unit, the object data being three-dimensional data;
   wherein the robotic control unit is capable of generating a map based on the object data, the map comprising map data, the map data including position data of detected obstacles or objects, the map data being two-dimensional data; and
   wherein the control application is capable of determining vehicle actions based at least in part on the map data, and the control application is capable of outputting a control command representing the vehicle actions to a vehicle control unit.

2. The robotically controlled vehicle of claim 1, wherein the vehicle actions include at least one of vehicle velocity and vehicle direction.

3. The robotically controlled vehicle of claim 1, wherein the sensor is a laser scanner.

4. The robotically controlled vehicle of claim 1, wherein the robotic control unit comprises a processor and a memory having executable code, the executable code comprising a drive arbiter that receives two-dimensional map data and vehicle destination data and generates a set of vehicle actions based on, at least in part, the map data and vehicle destination data.

5. The robotically controlled vehicle of claim 4, wherein the set of vehicle actions comprise provider components that create vehicle actions and projector components that limit vehicle actions.

6. The robotically controlled vehicle of claim 5, wherein the provider components comprise at least one of a teleoperation component, "Follow Me" mode information, odometer waypoints, and GPS waypoints; and
   wherein the projector components comprise map data.

7. The robotically controlled vehicle of claim 1, further comprising the vehicle control unit that is capable of receiving vehicle actions from the robotic control unit and is capable of outputting control signals to a vehicle actuator.

8. The robotically controlled vehicle of claim 1, wherein the robotic control unit is capable of outputting control signals to a vehicle actuator.

9. A robotically controlled vehicle comprising:
   a robotic control unit comprising a control application;
   a sensor for detecting object data representing detected obstacles or objects located outside of the robotically controlled vehicle and for transmitting the object data to the robotic control unit;
   wherein the robotic control unit is capable of generating a map based on the object data, the map comprising map data, the map data including position data of detected obstacles or objects;
   wherein the control application is capable of determining vehicle actions based at least in part on the map data, and the control application is capable of outputting a control command representing the vehicle actions to a vehicle control unit; and wherein the sensor is a laser scanner assembly adapted to connect to a robotic vehicle, the laser scanner assembly comprising:
- a laser scanner for transmitting a laser beam to detect the presence of an obstacle;
- a scanner mechanism for manipulating the position of the laser scanner; and
- a guard for protecting the laser scanner from damage and for allowing the laser beam to detect the presence of an obstacle, the guard comprising:
  - a base for connecting the laser scanner assembly to the robotic vehicle;
  - at least two support elements connected to the base; and
  - a plurality of support ribs connected to the at least two support elements.

10. The robotically controlled vehicle of claim 9, wherein the plurality of support ribs are positioned outside an angular window of the laser beam.

11. The robotically controlled vehicle of claim 9, wherein the plurality of support ribs have a first cross-sectional area and a second cross-sectional area larger than the first cross-sectional area; and
wherein the plurality of support ribs are positioned such that the first cross-sectional area of the plurality of support ribs is in an angular window of the laser beam.

12. A robotic vehicle comprising:
- a forward sensor assembly for executing a front range scan to obtain forward data representing obstacles or objects at least in front of the vehicle;
- a rear sensor assembly for executing a rear range scan to obtain rear data representing obstacles or objects at least behind the vehicle; and
- a robotic control unit for receiving the forward and rear data and generating an obstacle map based on the forward and rear data, the robotic control unit comprising:
  - the obstacle map;
  - a range guard application for detecting interruptions in the forward and rear data and substituting, based at least on the interruptions, data in the forward and rear data indicating the presence of obstacles in the forward and rear scan range; and
  - a control application for determining a trajectory based at least in part on the obstacle map and outputting control commands to a vehicle control unit based at least in part on the trajectory.

13. The robotic vehicle of claim 12, wherein the forward sensor assembly comprises a laser scanner.

14. The robotic vehicle of claim 12, wherein the rear sensor assembly comprises a laser scanner.

15. The robotic vehicle of claim 12, wherein the robotic vehicle is adapted to operate in a mode, the mode includes at least one of GPS waypoint, teleoperation, "Follow Me," and teach and playback.

16. The robotic vehicle of claim 15, wherein the robotic control unit is adapted to alter a robotic control vehicle speed and direction as directed by the mode based on the obstacle map.

* * * * *